(12) United States Patent
Kraczek et al.

(10) Patent No.: US 12,370,515 B2
(45) Date of Patent: Jul. 29, 2025

(54) REACTION CHAMBER FOR SUPERCRITICAL WATER OXIDATION REACTOR

(71) Applicant: SREUS ENERGY, LLC, Sandy, UT (US)

(72) Inventors: John Troy Kraczek, Farmington, UT (US); Gordon Ray Whipple, Centerville, UT (US); Paul James Freeman, South Jordan, UT (US)

(73) Assignee: SREUS Energy, LLC, Sandy, UT (US)

( * ) Notice: Subject to any disclaimer, the term of this patent is extended or adjusted under 35 U.S.C. 154(b) by 0 days.

(21) Appl. No.: 18/415,851

(22) Filed: Jan. 18, 2024

(65) Prior Publication Data

US 2024/0198306 A1 Jun. 20, 2024

Related U.S. Application Data

(62) Division of application No. 17/249,609, filed on Mar. 5, 2021, now Pat. No. 11,890,601.
(Continued)

(51) Int. Cl.
*B01J 3/08* (2006.01)
*B01J 3/00* (2006.01)
(Continued)

(52) U.S. Cl.
CPC ............... *B01J 3/008* (2013.01); *C02F 1/441* (2013.01); *F03B 1/00* (2013.01); *F03B 15/04* (2013.01);
(Continued)

(58) Field of Classification Search
CPC ............. B01J 3/008; B01J 2219/00162; B01J 2219/00135; B01J 2219/00182;
(Continued)

(56) References Cited

U.S. PATENT DOCUMENTS

| | | |
|---|---|---|
| 3,057,707 A | 10/1962 | Albert et al. |
| 3,519,396 A | 7/1970 | Eagle et al. |
| 5,558,783 A | 9/1996 | McGuinness |

FOREIGN PATENT DOCUMENTS

| | | |
|---|---|---|
| CN | 103708599 A | 4/2014 |
| FR | 2979842 A1 | 3/2013 |

OTHER PUBLICATIONS

U.S. Appl. No. 17/249,609, filed Mar. 5, 2021, Allowed.
(Continued)

*Primary Examiner* — Thuan D Dang
(74) *Attorney, Agent, or Firm* — Brake Hughes Bellermann LLP

(57) ABSTRACT

Fuel mixed in water is combusted in a reactor having an internal operating pressure and temperature greater than 3200 psi and greater than 374° C., where the combustion of the fuel is exothermic. Air and fuel are pressurized for introduction into the reactor to a pressure greater than the internal operating pressure using energy generated from the combustion of the fuel, and the pressurized air and the pressurized fuel are injected into the reactor. Pressurized water from the reactor is injected into a drive water column that is partially filled with water to increase a pressure of the drive water column, and water at a temperature less than 100° C. is injected into the reactor to replace water from the reactor that is injected into the drive water column. Pressurized water from the drive water column is used to drive a hydroelectric drive system to produce electrical power.

6 Claims, 14 Drawing Sheets

Related U.S. Application Data

(60) Provisional application No. 62/985,636, filed on Mar. 5, 2020, provisional application No. 62/985,612, filed on Mar. 5, 2020, provisional application No. 62/985,733, filed on Mar. 5, 2020, provisional application No. 62/985,652, filed on Mar. 5, 2020.

(51) Int. Cl.
| | |
|---|---|
| *C02F 1/44* | (2023.01) |
| *F03B 1/00* | (2006.01) |
| *F03B 15/04* | (2006.01) |
| *F23G 7/00* | (2006.01) |
| *C02F 103/08* | (2006.01) |

(52) U.S. Cl.
CPC ..... *F23G 7/001* (2013.01); *B01J 2219/00162* (2013.01); *C02F 2103/08* (2013.01); *F05B 2240/2411* (2013.01); *F23G 2201/70* (2013.01); *F23G 2202/30* (2013.01); *F23G 2900/50003* (2013.01)

(58) Field of Classification Search
CPC ...... B01J 2219/185; B01J 3/042; B01J 3/048; B01J 4/002; B01J 19/244; B01J 19/26; C02F 1/441; C02F 2103/08; F03B 1/00; F03B 15/04; F23G 7/001; F23G 2201/70; F23G 2202/30; F23G 2900/50003; F04F 1/06; F05B 2240/2411; Y02E 10/20; Y02E 20/12; Y02P 20/54
See application file for complete search history.

(56) References Cited

OTHER PUBLICATIONS

International Search Report and Written Opinion for PCT Application No. PCT/US2021/070245, mailed on Feb. 24, 2022, 21 pages.

1300

Inject combustible fuel into the interior of a first inner vessel in a direction, such that the introduced fuel creates a cyclonic rotation of the liquid in the interior of the first inner vessel about the longitudinal axis
1310

Inject water having a temperature less than 100 °C into a first water jacket space between the first inner vessel and an outer vessel
1320

Remove water from the interior of the first inner vessel, wherein water injected into the water jacket space and removed from the interior of the vessel flows through the first water jacket space around the one or more walls of the first inner vessel before entering the first inner vessel though an open end of the first inner vessel
1330

```
┌─────────────────────────────────────────────────────────────────────────────────────┐
│ Combust fuel mixed in water in a reactor having an internal operating pressure       │
│ greater than 3200 psi and having an internal operating temperature of greater than   │
│ 374°C, where the combustion of the fuel is exothermic                          1410  │
└─────────────────────────────────────────────────────────────────────────────────────┘
                                        ↓
┌─────────────────────────────────────────────────────────────────────────────────────┐
│ Pressurize air for introduction into the reactor to a pressure greater than the      │
│ internal operating pressure using energy generated from the combustion of the fuel   │
│                                                                                1420  │
└─────────────────────────────────────────────────────────────────────────────────────┘
                                        ↓
┌─────────────────────────────────────────────────────────────────────────────────────┐
│                    Inject the pressurized air into the reactor                       │
│                                                                                1430  │
└─────────────────────────────────────────────────────────────────────────────────────┘
                                        ↓
┌─────────────────────────────────────────────────────────────────────────────────────┐
│ Pressurize fuel for introduction into the reactor to a pressure greater than the     │
│ internal operating pressure using energy generated from the combustion of the fuel   │
│                                                                                1440  │
└─────────────────────────────────────────────────────────────────────────────────────┘
                                        ↓
┌─────────────────────────────────────────────────────────────────────────────────────┐
│                    Inject the pressurized fuel into the reactor                      │
│                                                                                1450  │
└─────────────────────────────────────────────────────────────────────────────────────┘
                                        ↓
┌─────────────────────────────────────────────────────────────────────────────────────┐
│ Inject pressurized water from the reactor into a drive water column vessel that is   │
│ partially filled with water to increase a pressure of the drive water column         │
│                                                                                1460  │
└─────────────────────────────────────────────────────────────────────────────────────┘
                                        ↓
┌─────────────────────────────────────────────────────────────────────────────────────┐
│ Inject water at a temperature less than 100 °C into the reactor to replace water     │
│ from the reactor that is injected into the drive water column vessel                 │
│                                                                                1470  │
└─────────────────────────────────────────────────────────────────────────────────────┘
                                        ↓
┌─────────────────────────────────────────────────────────────────────────────────────┐
│ Use pressurized water from the drive water column to drive a hydroelectric drive     │
│ system to produce electrical power                                             1480  │
└─────────────────────────────────────────────────────────────────────────────────────┘
```

FIG. 14

REACTION CHAMBER FOR SUPERCRITICAL WATER OXIDATION REACTOR

CROSS-REFERENCE TO RELATED APPLICATIONS

This application is a divisional application of U.S. patent application Ser. No. 17/249,609, filed Mar. 5, 2021, which claims the benefit of and priority to U.S. Provisional Application No. 62/985,612, filed Mar. 5, 2020, U.S. Provisional Application No. 62/985,733, filed Mar. 5, 2020, U.S. Provisional Application No. 62/985,636, filed Mar. 5, 2020, and U.S. Provisional Application No. 62/985,652, filed Mar. 5, 2020. Each of the aforementioned applications is incorporated by reference herein in its entirety.

TECHNICAL FIELD

This disclosure relates to oxidation reactors and, in particular, to reaction chambers for supercritical water oxidation reactors.

BACKGROUND

Supercritical water oxidation reactors (SCWOR) have been used to break down many different forms of contaminates in water, for example, ink, pharma waste, hazardous chemicals, and nerve agents. However, the pressures and temperatures used in SCWORs present challenging problems. For example, the energy cost for compressing and heating the fuel feed stock and the air to charge the reactor can be commercially prohibitive, and unfiltered gaseous feedstocks are corrosive to gas compressors, significantly reducing their effective lifespan. In addition, buildup of reaction byproducts from a supercritical water reactor system on components of the system can require costly maintenance of the system.

SUMMARY

In a general aspect an apparatus includes an enclosed outer pressure vessel containing liquid and an air pocket above the liquid and having walls, including one or more side walls, configured for withstanding a pressure difference between an inside of the enclosed outer pressure vessel and an outside of the enclosed outer pressure vessel of more than 3200 psi, wherein walls of the enclosed outer pressure vessel define a hollow cavity within the enclosed outer pressure vessel. The apparatus also includes a first inner vessel within the hollow cavity of the enclosed outer pressure vessel filled with liquid contained in the enclosed outer pressure vessel, the first inner vessel having one or more walls that define an interior of the first inner vessel, that define a longitudinal axis within the interior of the first inner vessel, and that define a first water jacket space between the one or more walls of the first inner vessel and the one or more side walls of the enclosed outer pressure vessel, where the first inner vessel is open at an open end of the first inner vessel. The apparatus also includes a liquid inlet port through a wall of the enclosed outer pressure vessel, the liquid inlet port defining a conduit for liquid to be injected into the first water jacket space from outside the enclosed outer pressure vessel. The apparatus also includes a first liquid outlet port through a wall of the enclosed outer pressure vessel, the first liquid outlet port configured to remove liquid injected through the liquid inlet port from the interior of the first inner vessel to outside the enclosed outer pressure vessel. The first inner vessel is arranged within the hollow cavity, such that liquid injected through the liquid inlet port and removed through the first liquid outlet port flows through the first water jacket space and into the interior of the first inner vessel through the open end of the first inner vessel. The apparatus also includes at least one fuel inlet port through a wall of the enclosed outer pressure vessel, the at least one fuel inlet port defining a conduit for fuel to be injected from outside the enclosed outer pressure vessel into the interior of the first inner vessel in a direction have an azimuthal component relative to the longitudinal axis and relative to a radial direction from the longitudinal axis to induce a cyclonic rotation in the liquid in the interior of the first inner vessel.

Implementations can include one or more of the following features, alone or in any combination with each other.

In an example, the enclosed outer pressure vessel can include metal.

In an example, the first inner vessel can include glass.

In an example, the first inner vessel can include ceramic.

In an example, the at least one fuel inlet port can include a nozzle having a hollow channel, a first hollow tube at least partially located in the hollow channel, and a second hollow tube located at least partially in the hollow channel and surrounding the first hollow tube, the second hollow tube extending further away from the wall of the enclosed outer pressure vessel than the first hollow tube, with the second hollow tube extending through the first water jacket space and into the interior of the first inner vessel.

In an example, the first and second hollow tubes can be angled upward, with respect to a direction of gravity from first ends proximate to the wall of the enclosed outer pressure vessel to second ends distal to the wall of the enclosed outer pressure vessel.

In an example, the second hollow tube can include openings in an end of the second hollow tube distal to the wall of the enclosed outer pressure vessel, the openings being configured to emit the fuel into the interior of the first inner vessel in the direction having the azimuthal component.

In an example, the apparatus can also include a heater within the enclosed outer pressure vessel, the heater being configured to heat the liquid in the interior of the first inner vessel to a temperature at which fuel in the liquid combusts.

In an example, the cyclonic rotation can creates a radial density gradient in the liquid in the interior of the first inner vessel with lower densities located along the longitudinal axis and higher densities located radially distant from the longitudinal axis.

In an example, exothermic combustion reactions of the fuel injected into the interior of the first inner vessel can release heat to maintain a pressure and temperature for water in the interior of the first inner vessel to be supercritical.

In an example, the apparatus can also include a second inner vessel within the hollow cavity of the enclosed outer pressure vessel, the second inner vessel having one or more side walls between the first inner vessel and a side wall of the enclosed outer pressure vessel, the one or more side walls of the second inner vessel defining the first water jacket space and a second water jacket space between the one or more side walls of the second inner vessel and the first inner vessel. And the first inner vessel and the second inner vessel can be arranged within the hollow cavity, such that liquid injected through the liquid inlet port and removed through the first liquid outlet port flows through the first water jacket space and through the second water jacket space into the interior of the first inner vessel through the open end of the first inner vessel.

In an example, the first liquid outlet port can include an opening into the first liquid outlet port located along the longitudinal axis.

In an example, the apparatus can also include a second liquid outlet port configured to remove liquid injected through the liquid inlet port from the interior of the first inner vessel to outside the enclosed outer pressure vessel, where the second liquid outlet port includes an opening into the second liquid outlet port located a distance away from the longitudinal axis, and where the opening into the second liquid outlet port is located below the opening into the first liquid outlet port.

In an example, the apparatus can also include a lid over the open end of the first inner vessel.

In an example, the lid can be connected to the one or more side walls of the second inner vessel.

In an example, the second inner vessel can include glass.

In an example, the second inner vessel can include ceramic.

In another aspect, a method includes, in a reaction chamber having an outer vessel and a first inner vessel located within a hollow cavity defined by walls of the outer vessel, the first inner vessel having one or more walls that define an interior of the first inner vessel, the interior containing liquid, the liquid having a temperature greater than 350° C. and a pressure greater than 3200 psi, and the one or more walls defining a longitudinal axis in the interior of the first inner vessel, injecting combustible fuel into the interior of the first inner vessel in a direction, such that the introduced fuel creates a cyclonic rotation of the liquid in the interior of the first inner vessel about the longitudinal axis. The method also includes injecting water having a temperature less than 100° C. into a first water jacket space between the first inner vessel and the outer vessel, and removing water from the interior of the first inner vessel, where water injected into the first water jacket space and removed from the interior of the first inner vessel flows through the first water jacket space around the one or more walls of the first inner vessel before entering the first inner vessel though an open end of the first inner vessel.

Implementations can include one or more of the following features, alone or in any combination with each other.

In an example, the outer vessel can include metal, and the first inner vessel can include glass.

In an example, the reaction chamber can include a second inner vessel within the hollow cavity, the second inner vessel having one or more side walls between the first inner vessel and a wall of the outer vessel. And the water injected into the first water jacket space and removed from the interior of the first inner vessel can flow through the first water jacket space around the one or more walls of the first inner vessel and through a second water jacket space between the one or more side walls of the second inner vessel and the first inner vessel before entering the first inner vessel though the open end of the first inner vessel.

In an example, removing water from the interior of the first inner vessel can include removing mineral-rich water from the first inner vessel through a first port having an opening in the interior of the first inner vessel a distance away from the longitudinal axis and removing mineral-poor water from the first inner vessel through a second port having an opening in the interior of the first inner vessel along the longitudinal axis.

In another aspect, a method includes combusting fuel mixed in water in a reactor having an internal operating pressure greater than 3200 psi and having an internal operating temperature of greater than 374° C., where the combustion of the fuel is exothermic, pressurizing air and fuel for introduction into the reactor to a pressure greater than the internal operating pressure using energy generated from the combustion of the fuel, injecting the pressurized air and the pressurized fuel into the reactor, injecting pressurized water from the reactor into a drive water column that is partially filled with water to increase a pressure of the drive water column, injecting water at a temperature less than 100° C. into the reactor to replace water from the reactor that is injected into the drive water column, and using pressurized water from the drive water column to drive a hydroelectric drive system to produce electrical power.

Implementations can include one or more of the following features, alone or in any combination with each other.

In an example, the method can also include controlling an internal pressure of the drive water column, such that the internal pressure of the drive water column when the pressurized water from the reactor is injected into the drive water column causes the injected water to vaporize and for oxide byproducts of combustion of the fuel in the reactor to precipitate in the water in the drive water column.

In an example, steam can be expelled from the drive water column into a condenser, and the steam can be condensed to water.

In an example, expelling steam from the drive water column can include refilling the drive water column with water received from the hydroelectric drive system to replace water from the drive water column that was used to drive the hydroelectric drive system.

In an example, the reactor can include an outer pressure vessel that includes metal and an inner pressure vessel that includes glass and that is located within the outer pressure vessel, and injecting water into the reactor can include injecting the water into a water jacket space around the inner vessel and between the inner vessel and the outer pressure vessel, and the injected water can enter an interior of the inner vessel from the water jacket space though an open end of the inner vessel.

In an example, where injecting the pressurized air and fuel into the reactor can include injecting the pressurized air and fuel into the inner vessel in a direction to cause a cyclonic rotation of the water in the interior of the inner vessel.

The details of one or more implementations are set forth in the accompanying drawings and the description below. Other features will be apparent from the description and drawings, and from the claims.

BRIEF DESCRIPTION OF THE DRAWINGS

FIG. 13 is a flowchart illustrating a method for operating a reactor.

FIG. 14 is a flowchart illustrating a method for producing electrical power, which can be implemented using apparatuses described herein.

Like reference symbols in the various drawings indicate like elements.

DETAILED DESCRIPTION

In a supercritical water oxidation reactors (SCWOR), water is heated and pressurized, so that the temperature of the water is far above the boiling point of water at atmospheric pressure (100° C.) but the pressure is high enough that the water does not boil, even at the elevated temperature. At high temperatures and pressures (e.g., for temperatures above 374° C. and pressures above 3210 pounds per square inch (psi))psi) water experiences a phase change to a supercritical state, in which the supercritical water acts as an aggressive catalyst of chemical reactions. Even at temperatures and pressures above 100° C. and 15 psi, but below the critical point of water, reactions within the SCWOR are significantly enhanced compared to reactors operating at atmospheric pressure. Thus, contaminants in supercritical water, such as, for example, hazardous chemicals, pharmaceutical waste, hydrocarbons, organic matter can be broken down efficiently when the water enters a supercritical phase.

In some implementations, SCWORs can be used to reduce long chain hydrocarbons and all organic matter. In this process, the hydrogen atoms are released from the hydrocarbon chain and bond to oxygen forming new water ($H_2O$). The carbons freed from the chain become carbon dioxide. Both reactions, like most of the other oxidation reactions that occur in the SCWOR, are exothermic, and the heat from the reactions increases the temperature of the liquid in the reactor.

SCWORs offer the possibility of producing clean energy from sewage, biogas, and other organic materials, because, unlike combustion of fuel in a diesel or boiler furnace, there are no sulfur dioxide emissions released into the air by the fuel used to power a SCWOR, and therefore the SCWOR process is very clean.

Figure 1:
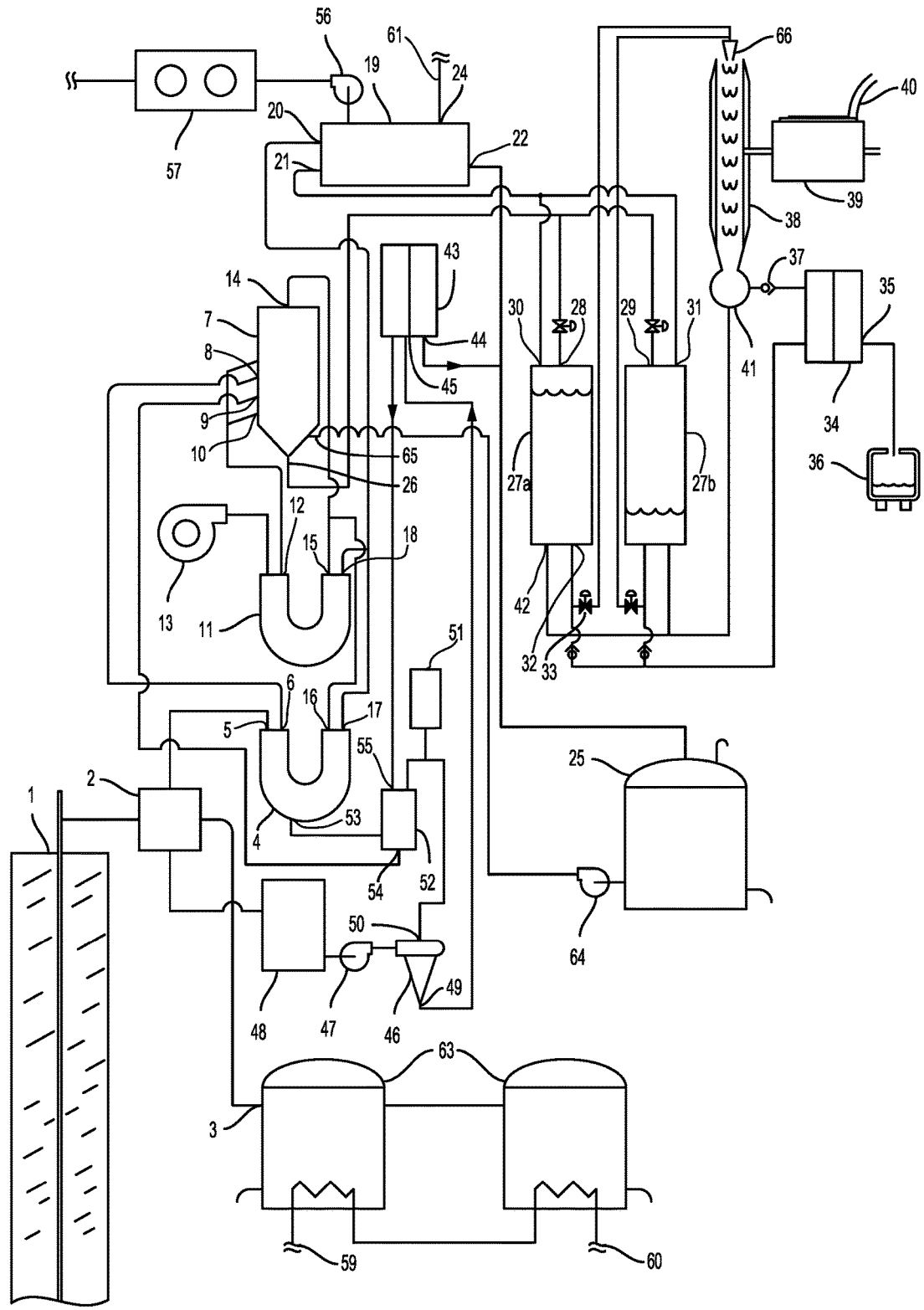
FIG. 1 is a schematic diagram of a supercritical water oxidation reactor system in an embodiment.

FIG. 1 is a schematic diagram of a supercritical water oxidation reactor system 100 in an embodiment. The system 100 can be used, for example, to break down waste material from an oil well. The system 100 includes a source 1 of fuel for a reactor in the system. In an example implementation, source 1 can include an oil well riser, which can provide fuel for the reactor in the form of waste material from an oil well to a water, oil, and gas separator 2. The separator 2 may be an existing component of an oil well and can divide the product stream from the oil well into three streams, including a sour or sweet gas stream that is fed at port 5 to a first charger system 4 that can supply fuel to the supercritical water oxidation reactor 7. The first charger system 4, in the system 100, can be referred to herein as a "U" charger. The separator 2 also may supply oil well production water to a surge tank 48. Oil from the separator 2 can be routed to one or more storage tanks 63 through an input port 3 to the tanks.

The sour or sweet well gas is drawn into first charger system 4, heated and pressurized and sent forward through port 6 to port 8 on a supercritical water oxidation reactor 7. The first charger system 4 can use pressure and energy from the reactor 7 gases to cycle, transferring pressure and heat to sour or sweet gases that are received in the charger system through port 5. Not shown are check and control valves that control the flow, or admission of the gas into the reactor 7 and management of the first charger system 4. Reactor 7 also can be fed other reactant streams including air, water, and liquid hydrocarbon when available.

A high-volume moderate pressure blower 13 gathers and compresses air to feed into a second charger system 11. Pressure and heat of the gases leaving the supercritical reactor 7 can feed into second charger system 11 and into first charger system 4 from port 14 of the reactor 7 to port 16 of the first charger system 4 and port 15 of the second charger system 11. The heat and pressure received from the reactor 7 can heat and pressurize air that is input to the charger systems 4 and 11 (e.g., respectively through port 5 and from blower 13) to pressures high enough to enter the reactor 7 through ports 8 and 10. Heated and pressurized gas from charger system 11 can be sent forward through port 12 to input port 10 on the supercritical water oxidation reactor 7.

Spent exhaust steam from cycling first charger system 4 and cycling second charger system 11 can be forwarded through ports 17 and 18, respectively, to vapor condenser 19 though an input port 20 to the condenser, where the steam is condensed, and pure distilled water is released from port 22 to fill a distilled water tank 25. Some of this pure water can be pumped back to the reactor 7, by way of high-pressure pump 64 and received at the reactor at port 65.

Oily water in a surge tank 48 can be pushed forward and pressurized by a pump 47 and then sent through a micro hydro cyclone bank 46 where free oils and droplets (e.g., having diameters as low as 15 microns) can be pushed through cyclone port 50 to a surge tank 51 and, further, to reactor pressure feed tank 52. Check valves (not shown) can prevent back flow from the reactor 7 to the cyclone separator bank 46. When gasses input to the first charger system 4 have reached a sufficiently high pressure (e.g., a pressure above an operating pressure of the reactor 7), a control valve on port 53 opens allowing some water to flow from the first charger system 4 to a pressure feed tank 52. This pressurizes tank 52 and its contents above the reactor pressure, forcing the oily water past check valves 54 and on to the reactor 7 via port 9, where the oily waters become fuel for the reactor 7.

Another stream from the micro hydro cyclone bank 46 can be sent from cyclone discharge 49 to high efficiency recycling molecular membrane osmosis unit 43 and into the unit 43 though an input port 45. Unit 43 can divide the stream into very clean water that leaves the molecular membrane osmosis unit 43 by way of port 44, from which the clean water is delivered to a clean water tank 25.

The remaining stream from the cyclone bank 46, containing additional hydrocarbons, organics, minerals and sands, can be then pumped forward to join the oily water in reactor pressure feed tank 52 through an input port 55 to the tank 52. It is then fed to the reactor 7, again through port 9, and reactor 7 breaks down remaining hydrocarbons and reacts and oxidizes remaining minerals to form salts and oxide crystals in the reactor 7.

The reaction in reactor 7 creates hot gases that leave the reactor 7 through port 14. The reactor 7 also produces surplus supercritical water that exits the reactor 7 along with any produced oxides or inert compounds via port 26.

Port 26 can deliver supercritical water from the reactor 7 to supercritical water generator system drive column pressure vessels (columns, drive columns, etc.) 27a and 27b, via ports 28 and 29, respectively. Drive columns 27a and 27b can include pressure vessels configured to hold water with a volume of air in a head space above the water in the vessel. Control valves can meter, or admit small doses of supercritical water into the drive columns 27a and 27b, where, with reference to the column 27a, the supercritical water explodes to steam in the head space above the water in the column, thus driving the water column down and out through port 32 and from port 32 through a check valve 33 to nozzle 66 on the hydraulic drive generator 38. In this example, column 27b can operate in like manner as column 27a to provide water to the nozzle 66. The hydraulic drive generator 38 can include one or more systems that convert kinetic energy and/or heat of the water received through nozzle 66 into electrical energy. For example, in an embodiment, the hydraulic drive generator 38 can include a direct drive Pelton wheel that is used to drive a generator/alternator 39 that outputs electrical power through a conductor 40.

Again, with reference to the drive column 27a, which also applies to column 27b, as the kinetic energy of the water is used to drive the hydro turbine, the drive water falls to a collection launder 41 and from there, by way of gravity or a pump, can be directed into the drive columns 27a to replenish, through port 42, water from the column that was used to drive the generator 39.

As the columns 27a and 27b are refilled with water, the water pushes the remaining steam from the supercritical water supplied at the beginning of the cycle up and out through respective ports 30 and 31, from where it is delivered forward to condenser 19 through an input port 21 on the condenser 19, where the steam is cooled and becomes pure water. The cooled and condensed water can then leave the condenser collection port 22 and flow to pure water tank 25.

In the plurality of hydraulic drive columns 27a, 27b, residual material (e.g., minerals, compounds, and salts, and solids) from the supercritical water oxidation reaction in reactor 7 are transferred with the supercritical water to the columns 27a, 27b. As the supercritical water flashes to steam in the columns 27a, 27b, residual material suspended in the water is released from the steam and precipitates out into the water in the columns 27a, 27b. These elements remain in the water that enters the generator 38 as the water circulates through the hydro turbine 38 until such time as a portion of the water at the bottom of the water column is pulled off when pressure in the column is at its peak. A small side stream drawn from the bottom of the water columns 27a, 27b can be tapped off of port 32 and passed to a molecular membrane unit 34. The cleaned water output from the membrane unit can be passed through a check valve 37 back into the collection launder 41, while the brines, oxides, acids and inert materials are redirected through port 35 to a collection vat 36.

The system 100 further includes a heat exchanger built into condenser 19 that can heat a glycol loop that is pumped by pump 56 through a precooler 57 and then on to an oil tank heater circuit 59, 60 and returning to the condenser 19 on line 61 through port 24, after passing through the crude tanks 63 to keep them up to temperature. In another embodiment, such a heating circuit, such as the heater circuits 59, 60, may be used to heat water for a community to provide hot water. In some implementations, the precooler 57, or an additional air exchange cooler, may be located at the incoming position (e.g., a port 24) to condenser 19 if temperatures in the tank farm heater circuits 59, 60 are not low enough to cool the condenser.

Figure 2:
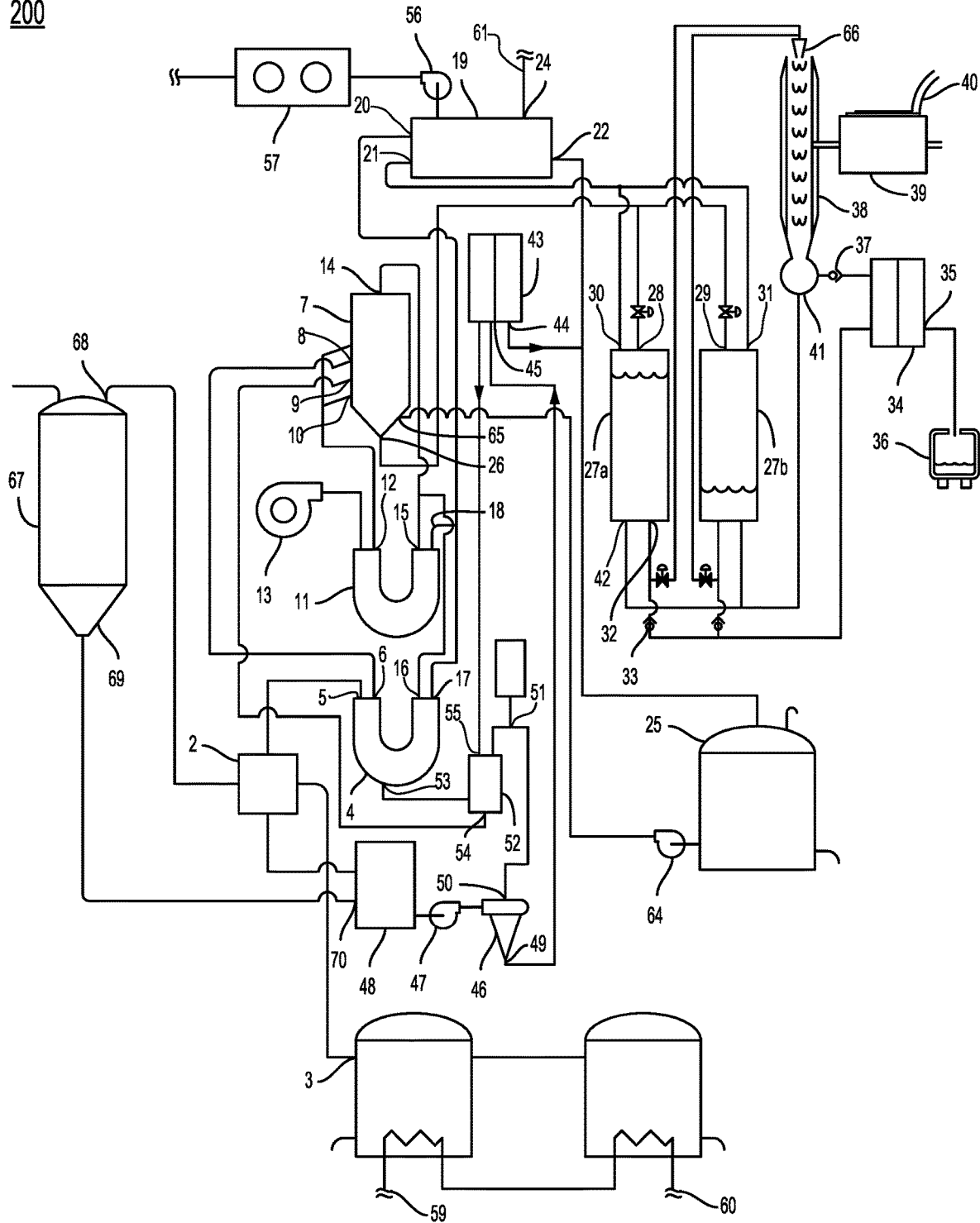
FIG. 2 is a schematic diagram of a supercritical water oxidation reactor system in another embodiment.

FIG. 2 is a schematic diagram of a supercritical water oxidation reactor system 200 in another embodiment. The system 200 is similar to that of FIG. 1, except that the reactor 7 is fueled by biogas and liquid bio or sewage slurry, rather than oil well production water or products.

Thus, in FIG. 2, rather than an oil well riser that provides fuel to the reactor, as in the system 100 shown in FIG. 1, instead, the system 200 includes an anaerobic digestor 67 that provides a source of bio-waste and/or sewage waste that is used as fuel in the reactor 7. Sour biogas can leave the digestor 67 through port 68, which ties into a liquid gas separator 2. Sludge from the digestor 67 can be pumped from port 69 of the digestor 67 into the surge tank 48 through an input port 70 on the tank.

In other embodiments, fuel can be supplied to the reactor 7 in other ways. For example, fuel can be supplied by way of one or more of a hopper, shredder, and/or a feed auger/extruder that feeds shredded fuel, such as waste materials, including plastic, paper, and/or biomaterials (e.g., peanut shells, husks, etc.) in their shredded state directly into reactor pressure feed tank 52.

Figure 3:
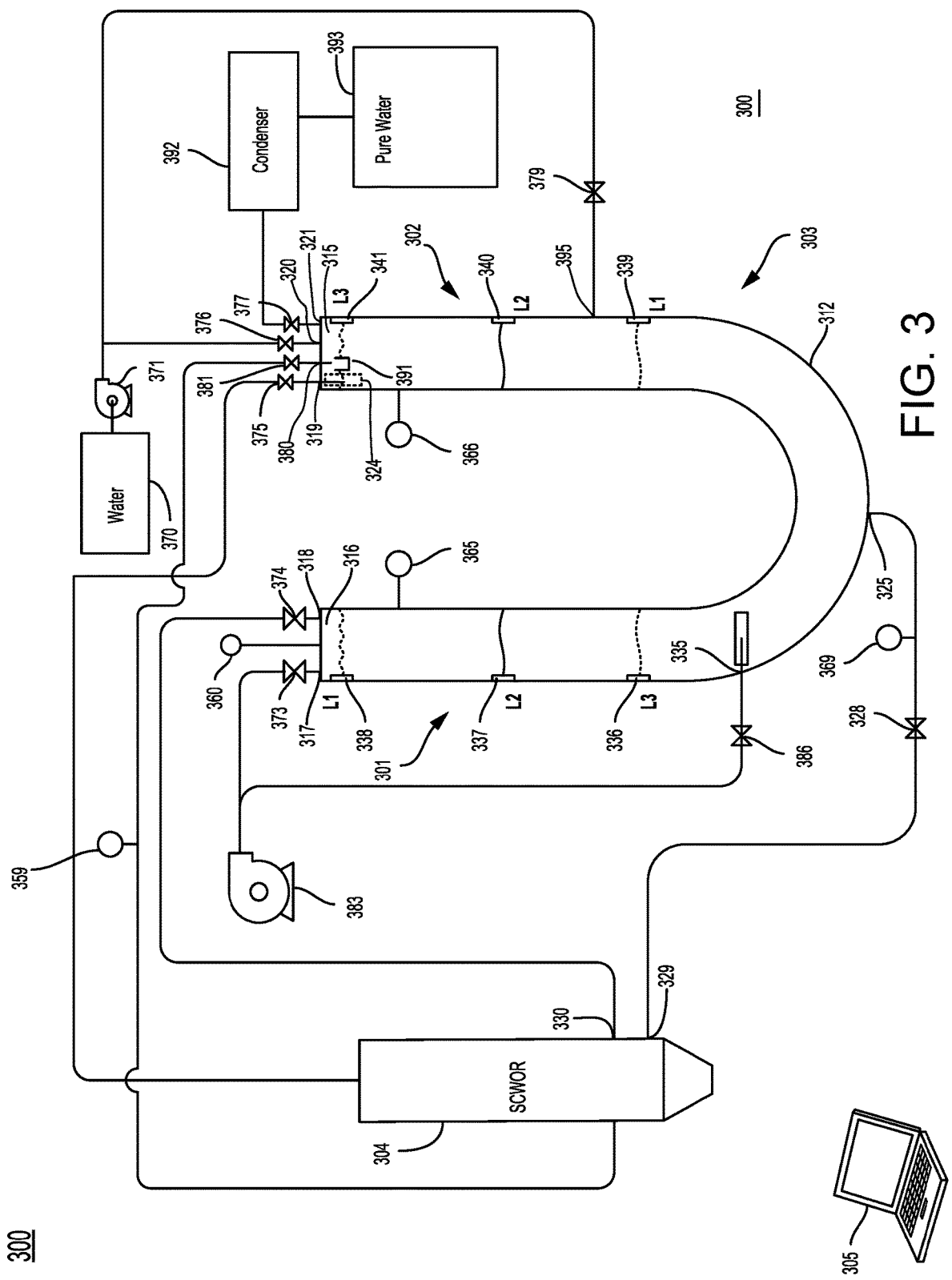
FIG. 3 is a schematic diagram of a system that includes charger system operably coupled to a supercritical water oxidation reactor, in which energy from byproducts of reactions within the reactor are used in the charger system to compress air, fuel, and/or water to pressures exceeding the operating pressure of the reactor for input to the reactor at the high pressures.

FIG. 3 is a schematic diagram of a system 300 that includes charger system 303 operably coupled to a supercritical water oxidation reactor 304, in which energy from byproducts (e.g., heat, steam, hot water) of reactions within the reactor 304 are used in the charger system 303 to compress gases (e.g., air, fuel) and/or water to pressures exceeding the operating pressure of the reactor 304 for input to the reactor at the high pressures. The charger system 303 can compress the gases and liquids without the use of a mechanical piston having a ring that forms a seal against an inner wall of a cylinder. Instead, the charger system 303 can include a vessel that is partially filled with a liquid (e.g., water) and that includes a first gas pocket at a first end of the vessel and a second gas pocket at a second end of the vessel, where the first and second gas pockets are separated by the liquid in the vessel, and where the liquid acts as, or forms a water trap seal, or liquid slug, that provides a seals against the inner wall of the vessel 312 to maintain separation between the first and second gas pockets.

Air and fuel gases for charging the reactor 304 can be introduced into the first gas pocket, and then the second gas pocket can be pressurized using energy from the reactor 304. The pressure in the second gas pocket can be transmitted to the gases in the first gas pocket through movement of the liquid in the water trap. When the pressure of the gases in the first gas pocket is sufficiently high (i.e., is greater than the operating pressure of the reactor 304), high-pressure gas from the first pocket can be released into the reactor. Pressure can be released from the charger system 303 to allow the introduction of a new amount of air and/or fuel gas to be introduced to the first gas pocket of the charger system 303. For example, low temperature water (e.g., in the form of a mist) can be used to cool gas and liquids in the second air pocket to reduce the temperature of the gas and liquids, and then the gas can be vented or released from the second air pocket to a condenser. When the pressure in the second air pocket decreases, a vacuum is created, which draws the water in the vessel toward the second air pocket, thus creating additional volume in the first air pocket for the introduction of new air and/or fuel gases to be introduced to the first air pocket for compression in a subsequent cycle.

In an implementation, the vessel of the charger system 303 can include a hollow U-shaped pressure vessel 312 having two ends 315, 316. The pressure vessel 312 can include one or more walls that define a hollow interior cavity that is configured to be partially filled with water, with a gas pocket on each side of the water. In an implementation, the vessel 312 can include a single cylindrical casting. In another implementation, the vessel can include two straight pipe spools that are connected with two 90-degree spools, as a welded pipe assembly. The vessel 312 can be made of material capable of withstanding high pressure, for example, stainless steel, carbon fiber, copper, or ceramic material. The material and wall thickness of the casting or welded spools of the vessel 312 are such that the vessel 312 can withstand the maximum pressure expected plus a safety margin or safety factor. The inner wall surface of the vessel 312 may include a corrosion-resistant steel or composite material or the interior can be lined with a corrosion-resistant material that can handle the design temperatures. The tops of the U-shaped pressure vessel 312 can be enclosed by a blind flange arrangement or by high-pressure bolts on cylindrical head(s) located at ends 315 and 316. In some implementations, hemispherical pressure heads may be used, rather than high pressure blind flanges and/or high-pressure bolts.

The vessel 312 can be partially filled with liquid (e.g., water). With a U-shaped vessel 312 oriented in a vertical position with the ends 315, 316 located in the tops of first and second straight legs, respectively, located above, with respect to a direction of gravity, the curved portion of the vessel, the liquid in the vessel 312 can act as a sealing trap, or liquid slug, between a first gas pocket located at a first end 316 of the vessel and a second gas pocket located at a second end 315 of the vessel.

As shown in FIG. 3, the liquid in the vessel is in an equilibrium position in which water reaches level L2 in a first side 301 of the vessel and reaches a level L2 and a second side 302 of the vessel. During operation of the system 300, the water levels inside the vessel 312 rise and fall as the water inside the vessel moves back and forth between the first side 301 and the second side 302 in response to increasing and decreasing pressures in the first and second air pockets located at ends 315, 316 of the vessel. For example, under a high pressure in the air pocket in the first end 316 and a low pressure in the air pocket in the second end 315, the water can move to a level L3 in the first side 301 and to a level L3 in the second side 302, and under a low pressure in the air pocket in the first end 316 and a high pressure in the air pocket at the second end 315, the water can move to a level L1 in the first side 301 and to a level L1 in the second side 302.

Vessel 312 can include gas ports (e.g., a low-pressure inlet port 317 and a high-pressure outlet port 318) located in vessel end 316 and gas ports (e.g., a high-pressure gas inlet port 319, a gas outlet port 321) and a high-pressure, high-temperature liquid inlet port 395 located in vessel end 315. The vessel also contains a low-temperature liquid inlet port 320 located in vessel end 315, and a liquid port 395 located in a side of the vessel between the vessel end 315 and the U-shaped portion of the vessel, and a liquid port 325 located in the U-shaped portion of the vessel.

An additional liquid port 335 can be included in the first side 301 of the vessel 312 below a lowest liquid level L3 under first end 316. An additional liquid port 395 can be included in the second side 302 of the vessel, for example, located below an equilibrium level L2 of the water in the second side 302 of the vessel. The charger system 303 can include liquid level sensors 338, 337, and 336 positioned on or within vessel 312 to sense when the liquid level in the first side 301 of the vessel is at levels L1, L2, and L3, respectively, below vessel end 316. Similarly, the charger system 303 can include liquid level sensors 339, 340, and 341 positioned on or within vessel 312 to sense when the liquid level in the second side 302 of the vessel is at levels L1, L2, and L3, respectively, below vessel end 315.

Signals from the sensors 336, 337, 338, 339, 340, and 341 can be provided to a controller 305 that controls the operation of the system 300, for example, through opening and closing of valves in the system. Sensors 338 and 341 transmit signals indicating a maximum fluid level at the respective vessel ends of the vessel at which the sensors 338 and 341 are located. Sensors 336 and 339 transmit minimum fluid level information for their respective vessel legs. Sensors 337 and 340 transmit return to equilibrium liquid level information.

The liquid in vessel 312 can absorb heat from the gases received from the reactor 304 gases through port 319 and distributed by the sparger 324 and gives up, or transfers heat to gas and liquid in the vessel 312. Liquid is cycled through vessel 312 at an optimized rate to maintain an optimized temperature to absorb a significant portion of the waste exhaust heat arriving into the vessel 312 via sparger 324.

A pressure transducer 360 can be located at the first end 316 of the vessel 312 to measure pressure of gasses in the first gas pocket at the first end 316 of the vessel. Thermometer (e.g., thermocouples) can be located in thermal wells 365 and 366 of the first side 301 and second side 302, respectively, of the U-shaped vessel 312 to measure temperature in vessel 312's ends 316 and 315, respectively, above an equilibrium level L2 of the water in each side of the vessel. The temperature of the liquid in the vessel also can be measured, for example, by temperature transmitter 369 at liquid port 325 in the U-shaped portion of the vessel that is below the minimum liquid level L3 of the liquid in the first side 301 of the vessel and below the minimum liquid level L1 of the liquid in the second side 302 of the vessel.

A control valve 373 (e.g., a solenoid valve that operates under electronic control, a check valve that operates in response to a pressure differential on different sides of the valve, or other automated valve) can be operated to supply air to the first air pocket at the first end 316 of the vessel 312 through port 317. In some implementations, the air can be supplied at atmospheric pressure through port 317. In some implementations, a blower 383 can supply air at a pressure higher than atmospheric pressure through port 317 to the first air pocket at the first and 316 of the vessel 312.

In another embodiment, air from blower 383 can be directed into vessel 312 through port 335 by opening a control valve 386 (e.g., a solenoid valve, a check valve, or other automated valve). Control valve 374 (e.g., a solenoid valve, a check valve, or other automated valve) can be opened/closed to control the flow of pressurized gases from the first air pocket near first end 316 of the vessel out of port 318 and into the reactor 304, and can be controlled to block the pressurized, charge air from leaving the first end 316 of the vessel 312 until the gas reaches a pressure greater than the pressure inside of the reactor 304, and conversely prevents high pressure fluids from returning from reactor 304 while the pressure in vessel 312 is below the operating pressure of the reactor 304.

The pressure of the air trapped in the first air pocket near the first end 316 of vessel 312 can be increased by the liquid level in the first side 301 of the vessel 312 rising from level L3 or L2 to L1. This change in liquid level can be driven by increasing the pressure of the second air pocket at the second end 315 of the vessel. For example, opening a control valve 375 (e.g., a solenoid valve, a check valve, or other automated valve) connected between the reactor 304 and a port 319 at the second end 315 of the vessel can allow high-pressure gases from the reactor 304 into the second air pocket in the vessel 312, thus increasing the pressure in the second air pocket and forcing the water in the vessel down in the second side 302 of the vessel and up in the first side 301. In an implementation, the hot gases from the reactor 304 can be injected through port 319 and out of a sparger 324 located within the vessel 312 at an end of a conduit that passes through the port 319. The sparger 324 may include a metal or ceramic cylinder, with one or more openings at the end of the cylinder and one or more openings in the round wall of the cylinder through which steam escapes from the conduit into the air pocket at the second end 315 of the vessel. The sparger 324 may be located, such that it is at least partially below liquid level L3 on the second side 302 of the vessel, such that when the liquid level is at L3, steam from the sparger 324 is emitted into the liquid and also into the air pocket above the liquid level.

When the hot gasses are received through port 319 and are emitted from the sparger 324, they can bubble through the liquid and move to the head space of the second air pocket at the second end 315 of the vessel 312, thus forcing the liquid down in the second side 302 of the vessel 312, and up in the first side 301 of the vessel 312. This movement of the liquid increases the pressure of the gas in the first air pocket in the head space at the first end 316 of the vessel 312, thereby preparing the gas to be to be delivered to the reactor 304 from the first end 316 of the vessel. The action of bubbling the gases through the sparger 324 can lower the temperature of the hot gases and transfer heat to the liquid in the vessel.

Pressure in the second air pocket at the second end 316 of the vessel can also be increased by the introduction of hot water (e.g., supercritical water) received from the reactor through port 380 by opening a control valve 381 (e.g., a solenoid valve, a check valve, or other automated valve) in a conduit between the reactor 304 and the port 380. The hot water can be injected into a metal or ceramic cup or bowl 391 located within the vessel 312 at the second end 315 of the vessel, so that the water flashes to steam in the second air pocket at the second end 315 of the vessel 312 and increasing the pressure in the vessel. A conduit that supplies hot water (e.g., supercritical water) from the reactor to the charging system 303, and other conduits in the system 300, can be made of, or lined with, a non-reactive material (e.g., ceramic, PTFE, stainless steel, etc.) to mitigate corrosion by the water. Additionally, one or more oxygen sensors 359 in the system 300 can monitor an amount of oxygen in water or vapor flowing through one or more conduits and/or in the reactor 304, and the reaction in the reactor 304 can be controlled to maintain a measured oxygen amount below a predetermined threshold value to mitigate corrosion within the conduits and/or valves connected to the conduits.

In an implementation, when a pressure of the air pocket at the first end 316 of the vessel (e.g., as measured by a pressure transducer 360) exceeds a first threshold value (e.g., equal to the operating pressure of the reactor 304), then valve 375 can close to block gases from transmission between the reactor 304 and the second air pocket at the second end 315 of the vessel through port 319, and a control valve 376 (e.g., a solenoid valve, a check valve, or other automated valve) can open to admit a momentary spray of water pumped by pump 371 from a water reservoir 370 through port 320 into the second end 315 of the vessel. The spray of water can be introduced as a mist into the hot gases at the second end 315, such that droplets of the mist expand to steam, thus increasing the pressure in the second end 315.

In addition, control valve 379 (e.g., a solenoid valve, a check valve, or other automated valve) can be opened to pass high pressure water through the port 395 into the second side 302 of the vessel 312, further pressurizing the charge air in the first air pocket at first end 316. When the pressure transducer 360 detects that the pressure in vessel 312 exceeds a second threshold value (e.g., a pressure greater than the pressure in reactor vessel 304 by a preset amount, typically more than 50 psi), control valve 374 (e.g., a solenoid valve, a check valve, or other automated valve) can be opened to transmit the charge air from the first air pocket through port 318 and into the reactor 304 through port 330.

To ensure that a desired amount of water remains in the vessel 312 and in the reactor 304 and to extract heat from vessel 312, when the pressure transducer 360 detects that the pressure in vessel 312 has fallen below a third threshold value (e.g., a pressure slightly above the pressure in reactor 304, e.g., 10 psi higher than the operating pressure of the reactor 304) or when a water level sensor 338 detects that the liquid level in the first side 301 of the vessel has reached a maximum level L1, valve 374 can be closed, and control valve 328 (e.g., a solenoid valve, a check valve, or other automated valve) can be opened to allow liquid to pass out of a port 325 in vessel 312 and through a port 329 into the reactor vessel 304. Valve 328 can remain open until the liquid level under head space in the second side 302 of the vessel drops below a lower level L3, at which point valve 376 can open to allow water to be pumped from reservoir 370 and sprayed into the second air pocket at the second end 315 of the vessel 312 until a metered amount of water is injected into the vessel. Once a water level in the vessel exceeds a minimum threshold level or the measured amount of water introduced (e.g., as indicated by a number of revolutions of a fixed displacement pump, such as the pump 371), valve 328 can be closed, and valve 376 can be closed, so that water neither enters nor exits the vessel 312. Then, valve 373 can be opened and valve 377 can be opened to vent steam and pressure from the second air pocket at the second end 315 through port 321 to a condenser 392 where water vapor is condensed and then routed to a storage tank 393. With valve 373 open, new charge air, pushed in by the blower 383, can enter the head space in the first air pocket at the first end 316 of the vessel, and pushing the water level down on the first side 301 of the vessel and up on the second side 302 of the vessel, thus pushing the remaining reactor gas (now cooled) and steam from the second air pocket out through port 321 and into condenser 392.

When the water level in the second side 302 of the vessel reaches L3 (e.g., as determined by water level sensor 341), valve 377 can be closed, and shortly thereafter valve 373 can be closed. At this point, the vessel 312 of the charging system 303 is prepared to cycle through another charge of air again, beginning with the opening of valve 375 to admit hot gasses from the reactor into the second air pocket at the second end of the vessel through port 319.

Valves of the system 300 (e.g., valves 373, 374, 375, 376, 377, 379, 381, 386, 328) can be operated under computer control by the controller 305. The controller can include one or more memory devices storing computer readable instructions and one or more processors configured for executing the instructions. The instructions may be executed to programmatically control operation of the system 300. For example, the timing of the opening and closing of the valves of the system 300 can be controlled such that the water in the vessel 312 cycles back and forth between a first state having a level L3 in the first and second ends 316, 315 of the vessel 312 in which charge gas is loaded into the first air pocket at the first end 316 of the vessel, and a second state having a level L1 in the first and second ends of the vessel, in which the charge gas is compressed to a pressure higher than the operating pressure of the reactor 304. Thus, the charger system 303 can operate in a two-stroke cycle, in which gas is loaded into the first air pocket in a first stroke of the water movement within the vessel 312 and then that gas is compressed in a second stroke of the water movement. The movement of the slug of water within the vessel 312 can have a natural oscillation frequency that can depend on physical parameters, including, for example, the mass of the water. In some implementations, the timing of the opening and closing of the valves can be selected such that the water in the vessel 312 is pushed back and forth within the vessel between its first state and its second state at a frequency that matches, or is close to (e.g., within about 10%), the natural oscillation frequency of the water in the vessel.

Although the configuration of the charger system 303 has been described herein primarily in the context of a U-shaped vessel, other configurations of a charger system having first and second air pockets separated by a water slug that couples pressure in one air pocket to another are also possible.

Figure 4:
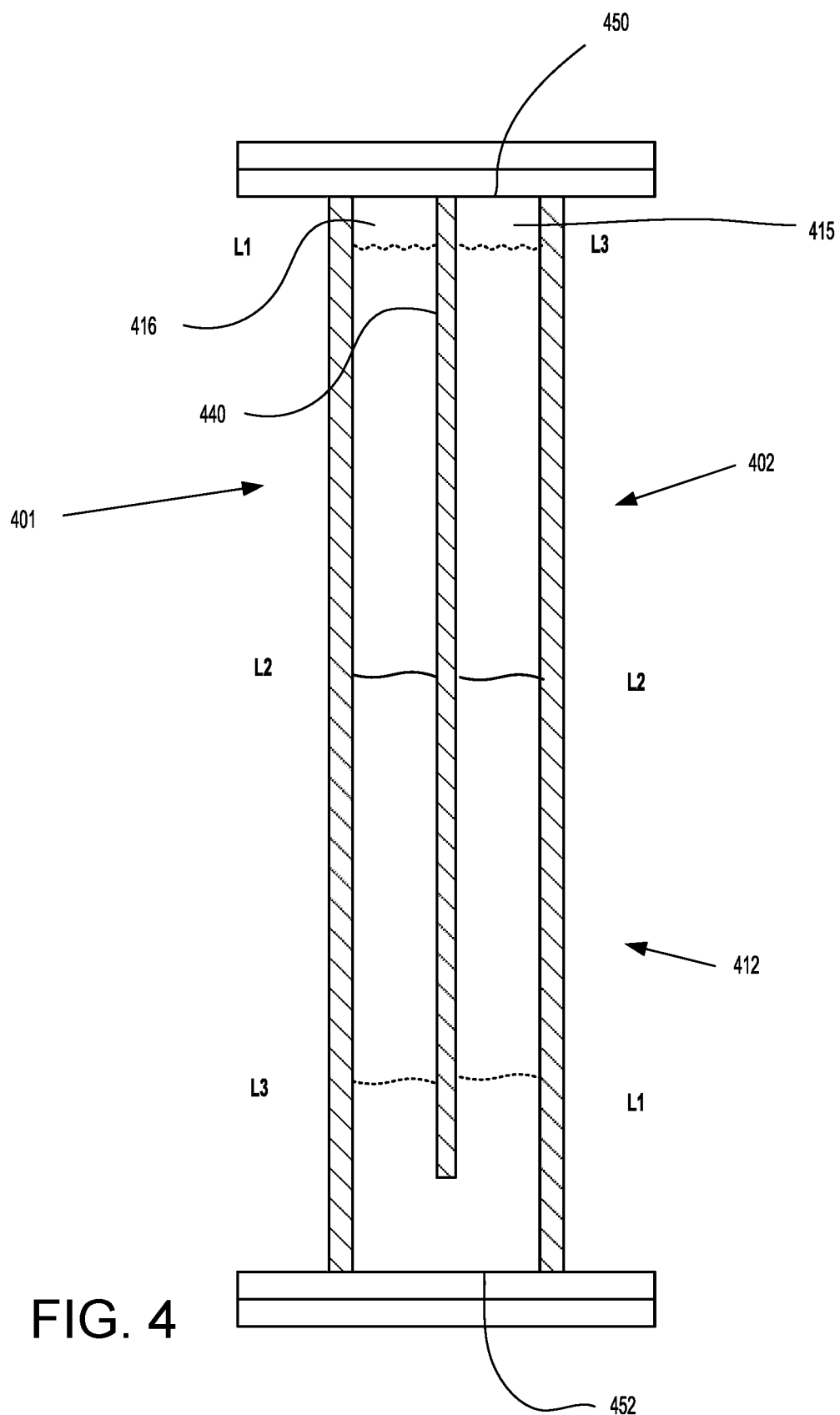
FIG. 4 is a schematic diagram of a vessel that can be used in a charger system.

For example, FIG. 4 is a schematic diagram of a vessel 412 that can be used in a charger system. The vessel 412 can include a right cylindrical cavity, for example, fabricated from a single spool of pipe, with a platen 440 that separates a first side 401 of the vessel from a second side 402 of the vessel, where the platen 440 extends from a top 450 of the vessel downward into a hollow interior cavity of the vessel but not all the way to the bottom 452 of the vessel.

Water can partially fill the interior cavity of the vessel 412 and can move back and forth two different sides of the platen 440 between a first state in which water is at levels L3 on the left and right sides 401, 402 of the vessel 412 and a second state in which water is a levels L1 on the first and second sides of the vessel. Charge gas can be loaded into a first air pocket at the first end 416 of the vessel when the water is in the first state and can be compressed to a high-pressure when the water is forced into the second state be the introduction of energy from the reactor into a second air pocket at the second end 415 of the vessel.

Other configurations of a vessel for use in the charging system 303 are also possible. For example, first and second chambers can be coupled by a tube or pipe, with water being loaded into the tube or pipe to create a transmission mechanism for transferring pressure from one chamber to the other. For example, the first chamber can be used to load charge gases, and the second chamber can be used to receive high-pressure gas for liquid from a reactor, thus increasing the pressure of the second chamber, which then transmits the increased pressure through the water in the connecting tube or pipe to the first chamber.

Figure 5:
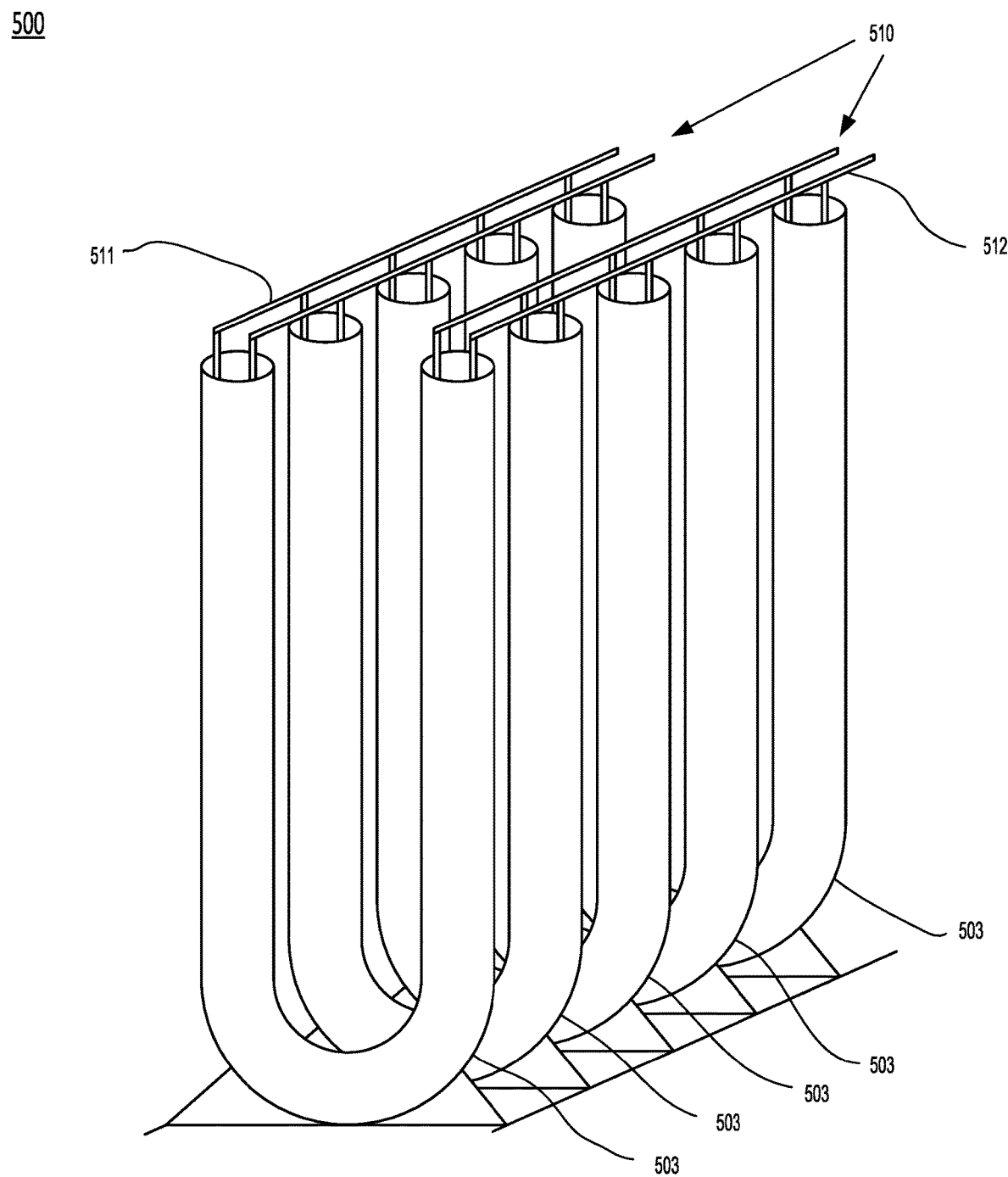
FIG. 5 is a schematic diagram of a plurality of charging systems connected in parallel for use in compressing gas for use in a reactor.

FIG. 5 is a schematic diagram of system 500 including a plurality of charging systems 503 connected in parallel for use in compressing gas for use in a reactor. The plurality of charging systems can be coupled by a manifold 510 where first side 511 of the manifold supplies low pressure charge gas and/or fuel gas to the plurality of charging systems 503 to be compressed before being fed to a reactor, and a second side 512 of the manifold 510 supplies high pressure gas and/or water from the reactor that is used to pressurize the charge gas or fuel gas. The supply of low-pressure charge gas and/or fuel gas and high-pressure gas and/or water to each of the plurality of charging systems can be controlled independently, such that the high-pressure charge gas can be delivered from different charging systems to the reactor at different times. This can dampen motion of the assembly of the different charging systems, for example, by reducing a range of motion of a center of mass of the system as the water in the different charging systems 503 moves back and forth. In addition, it can smooth temperature and/or pressure variations in various parts of the entire system, including, for example, the reactor, and in individual charging systems 503.

Figure 6:
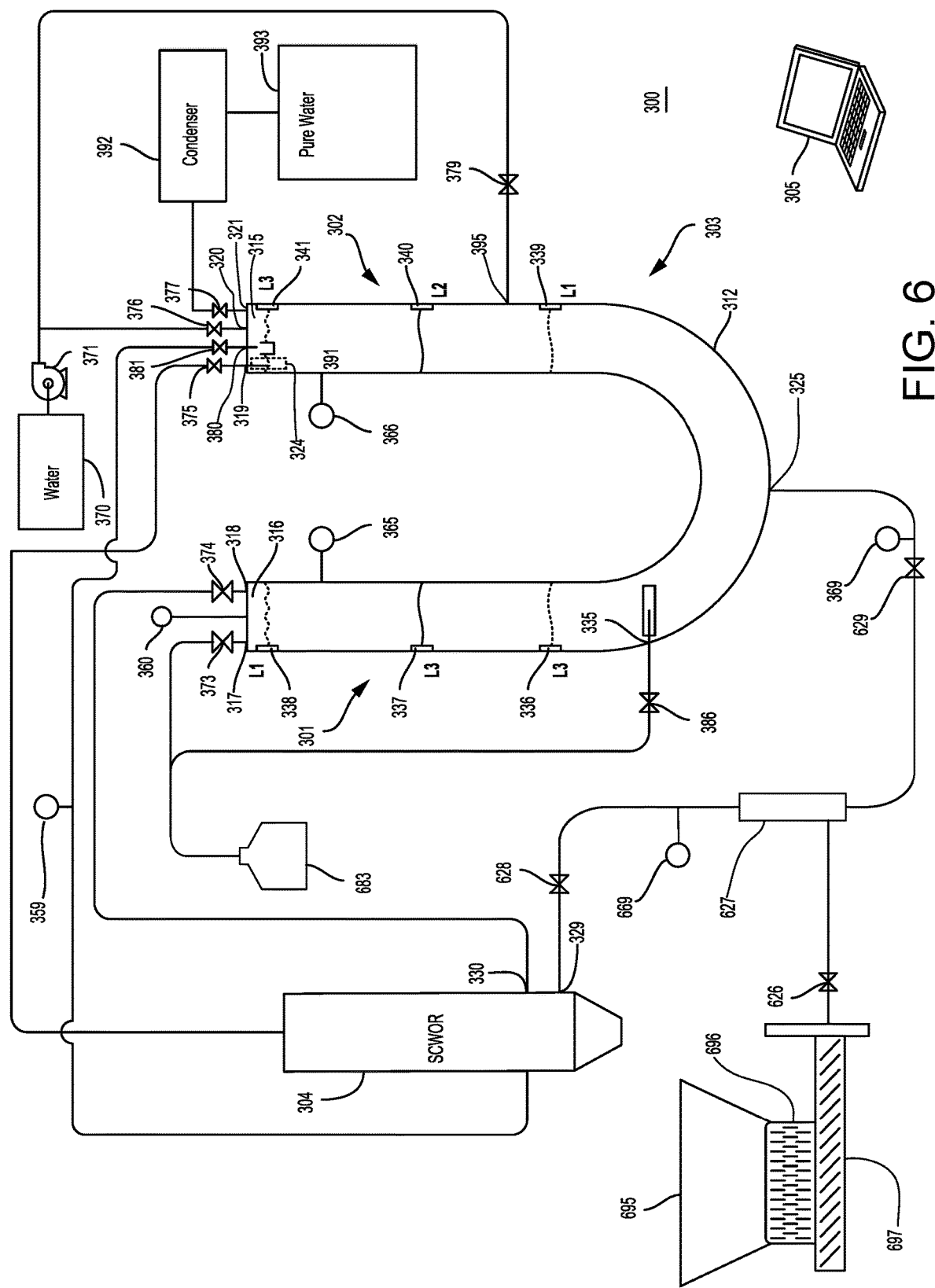
FIG. 6 is a schematic diagram of another implementation of a charger system, in which the charger system is used to compress fuel gas, liquid fuel, and/or solid fuel to pressures exceeding the operating pressure of the reactor for input to the reactor at the high pressures.

FIG. 6 is a schematic diagram of another implementation of the system 300, in which the charger system 303 is used to compress fuel gas (e.g., natural gas, sour gas, biogas, or other fuel gases), liquid fuel, and/or solid fuel to pressures exceeding the operating pressure of the reactor for input to the reactor at the high pressures.

As shown in FIG. 6, a fuel gas source 683 can be operably connected to the first air pocket at the first end 316 of the charger system 303 through a conduit that runs from the fuel gas source 683 to port 317. The gas source can be any source of fuel gas, including, for example, a tank of gas, a gas line (e.g., from an oil well, or other production facility), etc. Fuel gas can be supplied from the fuel gas source 683 to the first air pocket through the port 317, and the supply of the fuel gas can be controlled by control valve 373. In an implementation, the fuel gas can be supplied from the fuel gas source 683 at a pressure greater than atmospheric pressure and/or at a pressure greater than a predetermine pressure that is experienced by the first air pocket at the first end 316 of the charger at some time during a cycle of the liquid slug in the vessel 312. The valve 373 can include a check valve that opens when a predetermined pressure differential exists between a pressure of the fuel gas source on one side of the valve and a pressure of the first gas pocket on another side of the valve. In another implementation, the valve 373 can include a solenoid valve that is opened and closed by an electrical current (e.g., supplied by controller 305).

In another implementation, fuel gas can be supplied from fuel gas source 683 to within a first side 301 of the vessel 312 at a location that is below a level of the liquid slug or at a location that is below a level of the or liquid slug at least some time during a cycle of the liquid slug. For example, fuel gas can be supplied under control of a valve 386 through a port 335 into a first side 301 of the vessel and into the liquid plug, and bubbles of fuel gas can rise to the first air pocket at the first end 316 of the vessel for compression and then injection into the reactor 304.

In another implementation, liquid fuel and/or solid fuel suspended in a liquid from a fuel supply 695 can be injected into the reactor 304 by pressurized liquid from the charging system 303. The fuel supply 695 may provide fuel in the form of a sludge or slurry, which may include various forms of reactable liquids or solids, including, for example, shredded or blended garbage, wood pulp, sewage sludge, ground kelp, grass, hay, slurried peanut or soybean shells, crude oil, tank bottoms, animal renderings, and many more potential solid or liquid fuels for use in the reactor 304. The fuel supply 695 may include a shredder 696 configured to break down solid materials and an auger 697 configured to transport materials from the supply 695 to a slurry chamber 627. In another embodiment, the fuel supply may include a port configured for pumping a sludge or liquid fuel from the supply 695 to the slurry chamber 627.

To load fuel from the slurry chamber 627 into the reactor 304, in an example implementation, when pressure transducer 360 sends a signal indicating that the pressure in the vessel 312 exceeds a threshold pressure (e.g., a pressure greater than the operating pressure of the reactor 304 equal or when the liquid level sensor 338 detects that the level of the liquid slug has reached a threshold level in the first side of the vessel 312, valve 374 can be closed and then, with valve 626 closed, control valves 628 and 629 can be opened. In this state, liquid from the liquid slug in the vessel 312 can pass through port 325 and, from there, into and through the slurry loading chamber 627 that contains liquid and/or solid fuel, and from thence into the reactor 304 to deliver a paste, slurry, or liquid fuel to the reactor 304. Following a metered amount of paste flush (e.g., as measured by a flow meter 669 or as determined based on valves 628 and 629 being open for a predetermined time), valve 628 is closed.

With valve 628 closed, liquid and/or solid fuel can be loaded from the fuel supply 695 into the slurry chamber 627. For example, after fuel gas from supply 683 is loaded into the first air pocket at the first end 316 of the vessel 312 while the level of the liquid slug in the first side 301 of the vessel falls, then when the level of the liquid slug in the first side 301 of the vessel is below the level of sensor 337 at an equilibrium level L2 of the liquid slug, control valve 377 can close, thus shutting off the flow of fuel gas. With valve 377 open, valve 626 in a conduit between fuel supply 695 and slurry chamber 627 can be opened and with valve 629 open, pressurized slurry, sludge, or hydrocarbon liquid can be pumped into the slurry loading chamber 627. When the predetermined sludge charge is completed, valve 626 can be closed, followed by the closing of valve 629 closing next. With the closure of valve 377, the charging system 303 is then ready to be brought up to pressure by the introduction of energy from the reactor 304 into the second air pocket at the second end 315 of the vessel 312 and to repeat the cycle of loading fuel from the slurry chamber 627 into the reactor 304.

In a system 300 that includes a plurality of charging systems 303 that supply materials to the reactor 304, different system 303 can be used to compress and load different materials into the reactor 304. For example, one or more charging systems 303 can be used to compress and load oxygenated air into the reactor 304, while different charging systems 303 of the plurality can be used to compress and load fuel gas into the reactor 304, and while additional different charging systems 303 of the plurality can be used to compress and load solid or liquid fuel into the reactor 304.

In some implementations, the cycle time in which air and or fuel gas is compressed and loaded into the reactor can be shorter than the loading time to supply liquid and/or solid fuel from the supply 695 to the slurry chamber 627. In such a case, the slurry chamber 627 may be loaded during a time period, $T_1$, during which a pressure in the vessel 312 is relatively low, for example, when control valve 377 between the second air pocket at the second and 315 of the vessel 312 and the condenser 392 is open and valves 374, 375 between the vessel 312 and the reactor 304 are closed and valve 376 between the high-pressure liquid pump 371 and the vessel 312 is closed. However, this time period may be longer than a time period, $T_2$, during which air or fuel gas is supplied to the first air pocket at the first end 316 of the vessel 312. For example, $T_1$ can be more than 100 times longer than $T_2$. Thus, in a charging system 303 that is used to provide liquid and/or solid fuel (e.g., from a slurry chamber 627) to a high-pressure reactor using energy provided by the reactor, the charging system 303 may operate with a cycle time in which gas is provided to the first gas pocket of the vessel 312 during a first stroke of the cycle and energy from the reactor is provided to the second cast pocket of the vessel 312 during a second stroke of the cycle, but that cycle may be paused to allow for the loading of the slurry chamber while the slurry chamber is under relatively low pressure.

In another implementation, the system 300 can include a plurality of charging systems 303, where each of the plurality of charging systems 303 can have different capacities and dimensions that are selected based on the material that they are configured to provide to the reactor 304. For example, if a loading time for a first charging system that supplies solid material to the reactor is greater than a loading time for a second charging system that supplies gaseous material to the reactor, the dimensions of the first charging system may be selected such that a natural frequency of the liquid slug in the first charging system is lower than a natural frequency of the liquid slug in the second charging system to permit more time to load the solid and/or liquid material that is needed to load the gaseous material.

Referring again to FIG. 1, energy produced in reactor 7 through the oxidation of fuel in the reactor can be converted into electrical energy. For example, energy produced by the reactor 7 can be converted into kinetic energy of a liquid (e.g., water) that drives the hydraulic drive generator 38 that converts kinetic energy and/or heat of the liquid into electrical energy.

In example implementations, water (e.g., supercritical water) can be metered out of a high-pressure, high-temperature reactor, and the water can be discharged into the head space of a vessel that is partially (e.g., but mostly) filled with a liquid. The head space into which the water is discharged can have a lower pressure than the water output from the reactor, such that when the water is discharged into the head space above the liquid in the vessel, it explodes into steam, thus increasing a pressure of the liquid in the vessel (e.g., to a pressure close to that of the operating pressure of the reactor). With the liquid in the vessel now pressurized by the release of energy from the reactor (e.g., in the form of steam) having been injected into the vessel, the highly pressurized liquid in the vessel can be released from the vessel and into a hydroelectric drive system (e.g., a Pelton wheel generator) to drive the hydroelectric drive system to produce electricity.

With the release of pressurized liquid from the vessel, head space in the vessel increases, thus reducing the pressure and temperature of gas in the head space. By controlling an amount of water injected into the vessel from the reactor to pressurize the liquid in the vessel, such as in relation to the dimensions of the vessel, the amount of liquid in the vessel when the water from the reactor is injected, the temperature of the liquid in the vessel, etc. the pressure and temperature of gas in the vessel after the release of pressurized liquid from the vessel to the hydroelectric drive system can be controlled. For example, the temperature of gas in the vessel after the release of pressurized liquid from the vessel to the hydroelectric drive system can be controlled to be lower than 120° C. and the pressure can controlled to be less than 20 psi. After pressurized liquid has been released from the vessel to drive the hydroelectric drive system, and, for example, with the pressure of the vessel being close to atmospheric pressure, liquid in the vessel can be replenished. The addition of liquid to the vessel can push steam and vapors out of the head space of the vessel, for example, into a condenser (e.g., the condenser 19 in FIG. 1), and the steam and vapors can be captured and turned back into liquid. The process of pressurizing liquid in the vessel with energy from the reactor, driving the hydroelectric drive system with the pressurized liquid, replenishing the vessel with liquid, and pushing vapor out of the vessel can then begin again.

Figure 7:
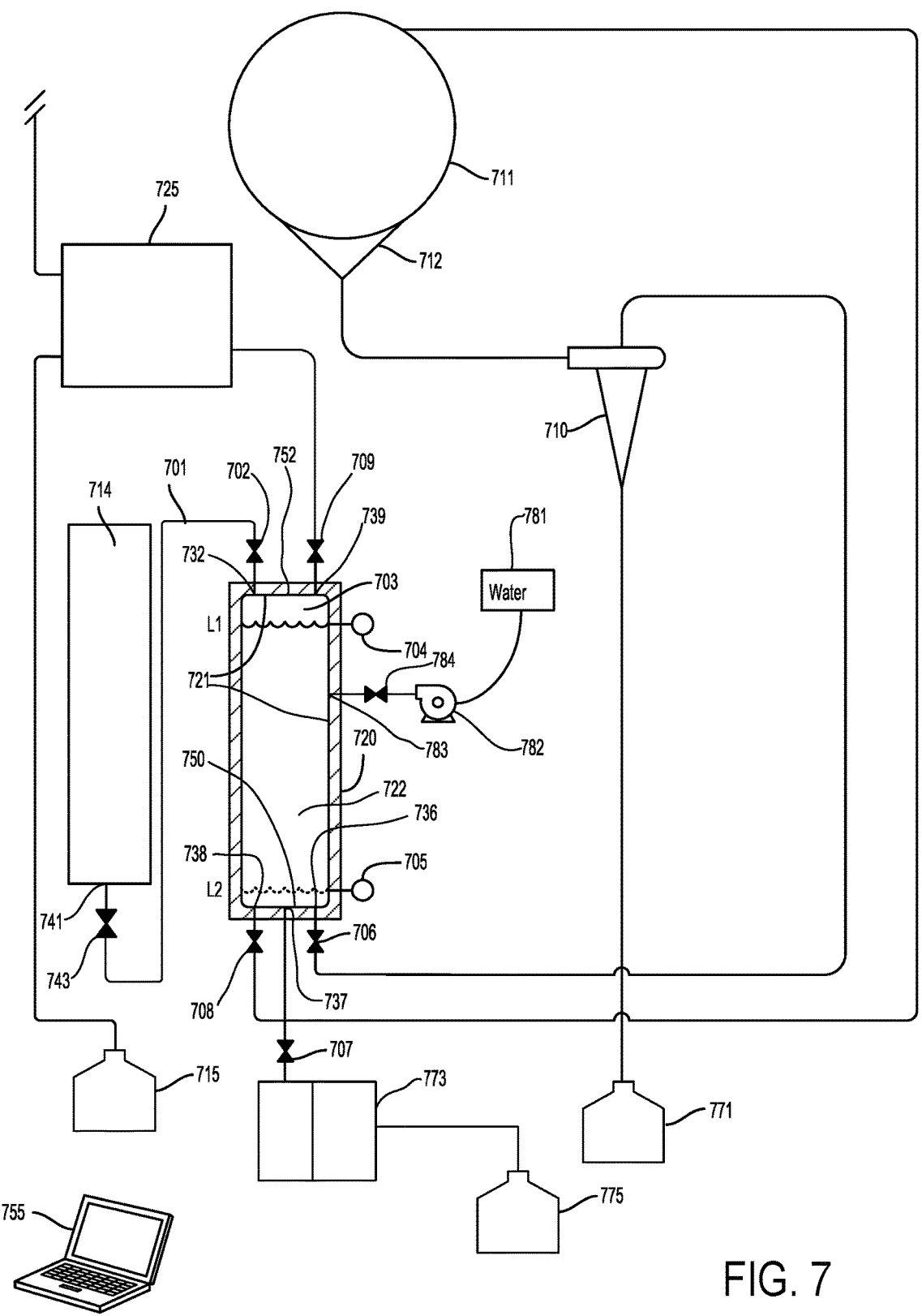
FIG. 7 is a schematic diagram of a hydraulic drive system in which energy produced by a supercritical water reactor is used to drive the hydroelectric drive system to produce electrical power.

FIG. 7 is a schematic diagram of a hydraulic drive system 700. In the system 700, energy produced by a supercritical water reactor 714 is used to drive a hydroelectric drive system 711 to produce electrical power and to remove reaction byproducts (e.g., solid, particulate, and soluble byproducts) from the reactor 714. The system 700 includes a pressure vessel 720 that includes a hollow interior cavity defined by one or more inner walls 721 of the vessel. Vessel 720 can be made of one or more materials capable of, and designed and configured for, withstanding pressures inside the inner cavity that exceed an operating pressure of the supercritical water reactor 714 by a predetermined threshold amount (e.g., pressures of 3000 psi, 5000 psi, 7500 psi). For example, the vessel 720 can include a cast metal or a welded assembly that defines the hollow inner cavity and that is provided with flanges, high-pressure bolt-on cylindrical head(s), or other means of closure and/or inspection. The hollow interior cavity of the vessel 720 can be configured to include liquid (e.g., water) 722 and an air pocket or a head space 703 above the liquid 722. The liquid 722 in the vessel 720 can be cycled between an upper level L1 and a lower level L2 by controlling a variable volume of liquid 722 in the vessel. Additionally, the pressure of gas in the air pocket 703 and of the liquid 722 in the vessel 720 can be controlled by controlling an amount and pressure of gas and/or liquid that is injected into the air pocket 703.

The vessel 720 can include liquid ports 736, 738 configured for liquid to flow into and/or out of the vessel 720, and gas ports 732, 739 configured for gas to flow into and/or out of the vessel. The flow of liquid through liquid ports 736, 738 can be controlled by control valves 706, 708, respectively. The flow of gas through gas ports 732, 739 can be controlled by control valves 702, 709, respectively. In an implementation with an elongated vessel having a first end 750 and a second end 752, liquid ports 736, 738 can be located at a first (e.g., bottom or lower) end 750 of the vessel 720, and gas ports 732, 739 can be located at a second (e.g., top or upper) end 752 of the vessel 720.

A drive liquid (e.g., water) 722, can be initially loaded into vessel 720, until the liquid reaches a predetermined level L1 in the vessel. The liquid level can be determined by a liquid level sensor 704, and the predetermined level L1 can be located sufficiently below the top of vessel 720 to ensure a sufficient volume in the air pocket 703 to receive gas to pressurize the interior of the vessel.

Water that is pressurized by reactions within the supercritical water reactor 714 can be released from a port 741 in the reactor into a conduit 701 that feeds the water into the vessel 720 through port 732. The release of the water from the supercritical water reactor 714 can be controlled by a control valve 743. The water released from the supercritical water reactor 714 can include one or more byproducts from the reactions that occur within the reactor, for example, salts, minerals, acids that result from the reactions within the reactor 714. In some implementations, the conduit 701 can include a metal tube. In some implementations, an inner wall of the conduit can be lined with a non-reactive material, such as, for example, ceramic, PTFE, etc. to protect an inner wall surface from corrosive and/or abrasive byproducts of reactions in the reactor 714 that may be the carried in water in the conduit. For example, reaction byproduct materials may not be dissolved in supercritical water as readily as they are in water that is not in a supercritical state, but rather may be suspended in the supercritical water solution, such that they may be more abrasive when transported by supercritical water, and therefore a non-reactive, abrasion-resistant lining material of the conduit 701 may extend the useful lifetime of the conduit.

Pressurized water (e.g., supercritical water) from the supercritical water reactor 714 transported through conduit 701 can be released into the air pocket 703 through port 732 when control valve 702 is open. Port 732 may be coupled to a spray nozzle within the vessel 720. In some implementations, a controller 755 or a timer can control the operation of control valve 702 to release a metered amount of pressurized water from the supercritical water reactor 714 through port 732 and into the air pocket 703.

As the pressurized water (e.g., supercritical water) is injected (e.g., sprayed) into the air pocket 703, it expands, and the expansion causes the water to vaporize (i.e., flash to steam). The expansion and vaporization of the pressurized water that is injected into the air pocket 703 through port 732 causes pressure in the air pocket 703 to rise quickly, e.g., to a pressure approaching the operating pressure of the supercritical water oxidation reactor 714. For example, a pressure of the air pocket can rise to greater than 85% of the operating pressure of the reactor. With the pressure in the air pocket 703 approaching that of the operating pressure of the reactor 714, the flow of water from the reactor 714 to the vessel 720 slows. In addition, control valve 702 may be closed at any point earlier in the cycle to control the amount of liquid delivered to air pocket 703, thereby limiting the pressure to the air pocket to a given design parameter. The increased pressure in the air pocket 703 also pressurizes the liquid 722, which generally includes an incompressible liquid (e.g., water).

When the liquid 722 is pressurized, valve 708 can be opened to allow high-pressure water to flow out of the vessel 720 through port 738 to the hydroelectric drive system 711. The hydroelectric drive system 711 can receive the pressurized water from the vessel 720 and use the pressurized water to convert mechanical energy into electrical energy. For example, the pressurized water can be used to drive a turbine (e.g., a Pelton wheel or water turbine) that is connected to a generator or alternator that converts mechanical energy into electrical energy.

When water 722 exits vessel 720 and drives the hydroelectric drive system 711, the water level in the vessel 720 falls, for example, from the level L1. As the water level in 720 falls, with valve 702 open, more pressurized water from the reactor 714 flashes to steam, thus adding energy to the air pocket 703 above the falling level of the water 722 and continues to push the water 722 out of port 738. When the level of water 722 falls below a predetermined level in the vessel 720 and/or when a predetermined amount of water from the reactor 714 has been injected into the air pocket 703 above the water 722, valve 702 can be closed, though water 722 can continue to exit the vessel 720 through port 738 to supply energy in the form of pressurized water to the hydroelectric drive system 711.

When the water 722 has flowed out of the vessel 720, or reaches a minimum level L2 in the vessel (e.g., as determined by a water level sensor 705), a pressure of the air pocket 703 in the vessel may be close to an operating pressure of the hydroelectric drive system 711, which may be less than about 30 psi. At this point, control valve 709 can be opened (e.g., by controller 755) to allow gases and vapors in the air pocket 703 to be vented out of the vessel 720 through port 739, so that the vessel can be refilled with liquid. In some implementations, the vented gases and vapors can be routed from the vessel 720 through port 739 to a condenser 725 that condenses the gases and vapors to liquid. For example, water vapor can be condensed to pure distilled water in the condenser 725, and the condenser 725 can output the distilled water to a storage tank 715.

After the pressurized water has passed through the hydroelectric drive system 711, it can drop into a collector launder 712. From the collector launder 712, the exhaust water from the hydroelectric drive system 711 can be fed through a de-sanding cyclone 710 that separates solids and/or mineral crystals from the exhaust water and collects the solids and/or mineral crystals that were transmitted from the reactor 714 through the vessel 720 and through the hydroelectric drive system 711. The collected solids and/or mineral crystals can be deposited into a storage tank 771. Filtered and demineralized water then can flow from the de-sanding cyclone 710 back to the vessel 720 through port 736 to refill the vessel, where the flow of the filtered demineralized water can be controlled by control valve 706. Refilling the vessel with the filtered and demineralized water can being when a pressure inside the vessel is below a threshold value (e.g., below 40 psi, below 30 psi, below 20 psi).

In an implementation, the hydroelectric drive system 711 and/or the de-sanding cyclone 710 can be located at a higher level than vessel 720, so that water for refilling the vessel 720 can be fed gravitationally from the cyclone 710 to the vessel 720. In some implementations, the hydroelectric drive system 711, the launder 712 and/or the de-sanding cyclone 710 can be maintained at a pressure greater than atmospheric pressure (e.g., greater than 25 psi or 10 psi above atmospheric pressure) to provide additional pressure to the water that refills the vessel 720. Refilling the vessel 720 reduces the volume of the air pocket 703 and pushes out steam and vapor from the air pocket 703 through port 739 to the condenser 725, where it is cooled to become pure water liquid. In some implementations, the condensed water from the condenser 725 can be stored in a tank 715 for reuse in the system 700. In some implementations, the condensed water can be exported to outside water users or utilities.

Liquid from vessel 720 also can be output through port 737 (e.g., under control by control valve 707) to a reverse osmosis filter unit 773 that is configured to filter out the buildup of salts and acids (e.g., sulfuric acid) from water 722 in the vessel 720. A portion of high-pressure water can be bled from the column of water 722 when the column is pressurized and sent forward to reverse osmosis filter unit 773 for filtering, and filtered water from the reverse osmosis unit can be stored in a storage tank 775. This can mitigate the concentration of acids, solution-born brines and/or minerals from building up in the hydroelectric drive system 711 as liquid is circulated between the vessel 720 and the hydroelectric drive system 711 in repeated cycles of pressurizing the air pocket 703 of the vessel 720, injecting high-pressure water from the vessel 720 into the hydroelectric drive system 711, and returning spent water from the hydroelectric drive system 711 to the vessel 720 (e.g., from the de-sanding cyclone 710).

In some implementations, liquid removed from the vessel 720 can be replenished, for example, from a liquid or water source 781, where the replenishing liquid can be pumped (e.g., by a pump 782) through a port 783 into the vessel 720, where the provision of the replenishing liquid through the port 783 is controlled, for example, by a valve 784.

A controller 755 can monitor water levels L1 and L2 (e.g., through the reception of signals from one or more water level sensors 704, 705), as well as temperatures and pressures in the vessel 720. The controller 755 can then determine an amount of pressurized water from to meter from the reactor 714 into vessel 720 based on these inputs. The controller 755 can control one or more control valves (e.g., valves 702, 706, 707, 708, 709, 743, 784) in the system 700 to control operation of the system 700. In some implementations, one or more valves can operate automatically to open and/or close in response to predetermined pressure differentials on either side of the valve. In some implementations, one or more valves can operate under computer, electronic, pneumatic, etc. e.g., control of the controller 755, to open and/or close in response to one or more signal sent by the controller 755 to the valve.

By driving the hydroelectric drive system 711 with energy from the reactor 714 indirectly, by using energy from the reactor to pressurize vessel 720, and by using pressurized water from the vessel to power the hydroelectric drive system 711, hazardous, damaging, and corrosive reaction byproduct materials from the reactor 714 can be removed from the water in the reactor 714 in a manner that reduces fouling of components of the system 700, and/or concentrates the reaction byproducts in components of the system that can be easily and economically replaced. For example, when supercritical water is received into the vessel 720 from the reactor 714 through port 732, and is converted to steam/vapor, because the temperature of the water 722 in the vessel 720 can be significantly below the operating temperature of the reactor 714 (e.g., the temperature of the water 722 is less than 100° C.), reaction byproducts that are carried in the water from the reactor 714 into the vessel 720 can precipitate out of the water and be dissolved into the water 722. Then, reaction byproducts in the liquid that is supplied from the vessel 720 to the hydroelectric drive system 711 can be removed (e.g., into a storage tank 771) by the de-sanding cyclone 710 from the loop formed by the vessel 720 and the drive system 711. Additional reaction byproduct materials can be removed from the vessel/drive system loop by removing water 722 from the vessel 720 into a reverse osmosis system 773 for processing. In this manner, reaction byproducts and waste heat from the reactor 714 can be removed from the reactor 714, without running the reactor water through a traditional heat exchanger system, where reaction byproducts are prone to foul interior surfaces of the heat exchangers. Rather, the reaction byproducts can be removed into the water 722, which water is then used to generate electrical power by driving a hydroelectric drive system 711, thus converting heat from the reactor 714 into electrical power, while solid and liquid reaction byproducts can be removed from the water through the de-sanding cyclone 710 and the reverse osmosis unit 773 and relatively low temperatures.

An additional advantage of using a column of water 722 that cycles between a first upper level L1 and the second lower level L2 to receive water and reaction byproducts from the reactor 714 and to drive the hydroelectric drive system 711 is that the vessel 720 operates without any moving mechanical pistons to pressurize the water 722 and to drive the system 711. Therefore, if reaction byproducts from the reactor 714 adhere to inner walls of the vessel 720 (e.g., to build up a scale on the walls), the cycling column of water 722 can continue to operate as a liquid drive piston within the vessel, whose inner dimensions may shrink because of the buildup of reaction products on the inner walls of the vessel 720.

System 700, in some implementations, can enable the use of reactor 714 to drive electrical power production equipment directly off of biofuels, sour gases, and/or waste streams, such as sewage, without producing significant pollution emissions, and without combustion of those fuels, which can shorten the life spans of bio diesel, duel fuel, boiler tube equipment and/or direct fire turbines. In addition, in some implementations, the use of waste streams and biofuels can result in a zero carbon footprint scenario. In addition, in some implementations, minerals, crystals and other byproducts of reactions in the reactor 714 can be captured in a simple and cost-effective way that produces power and leaves pure water as a biproduct.

Figure 8:
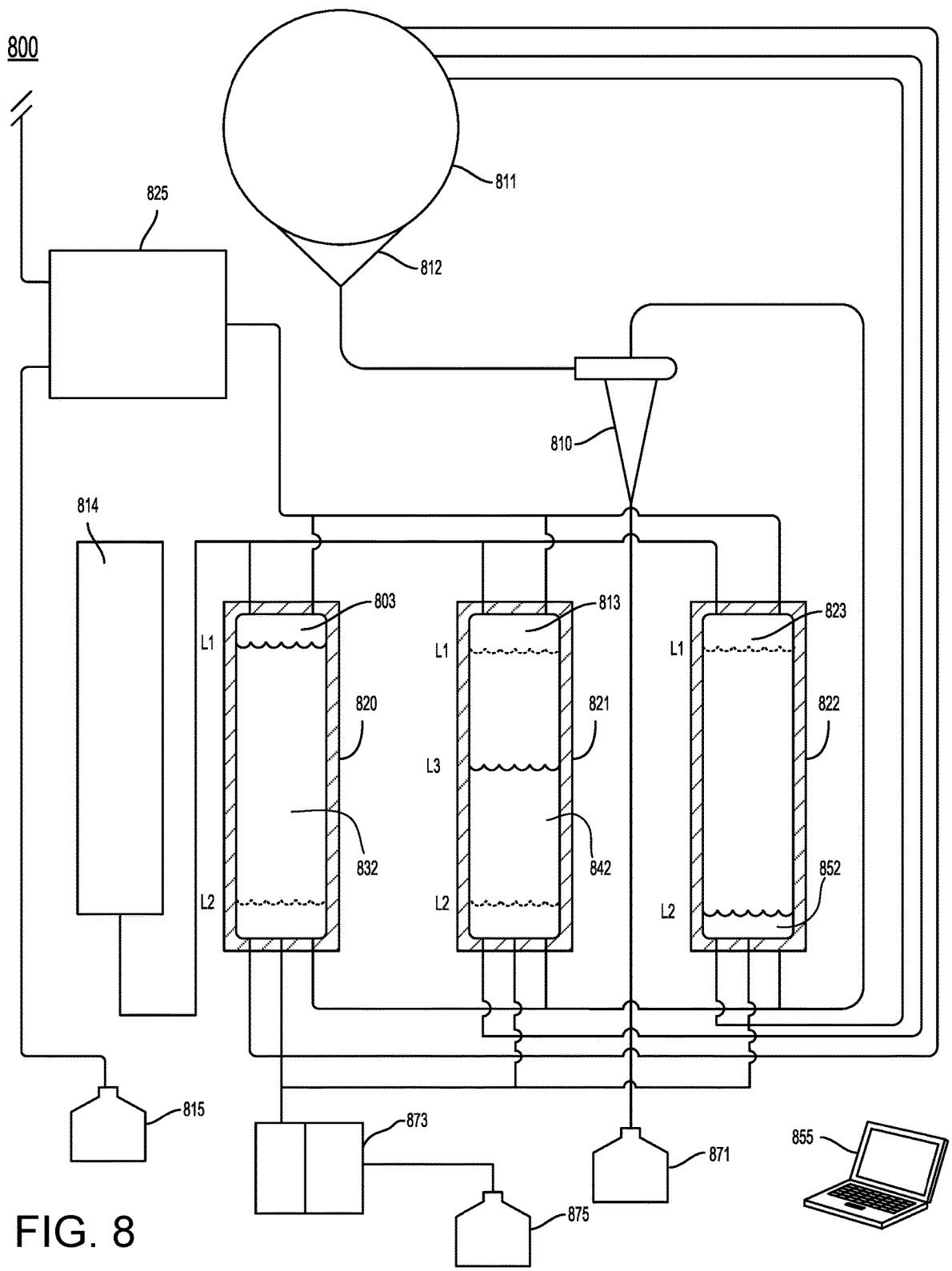
FIG. 8 is a schematic diagram of a hydraulic drive system in which energy produced by a supercritical water reactor is used to drive a hydroelectric drive system to produce electrical power.

FIG. 8 is a schematic diagram of a hydraulic drive system 800 in which energy produced by a supercritical water reactor 814 is used to drive a hydroelectric drive system 811 to produce electrical power and in which reaction byproducts (e.g., solid, particulate, and soluble byproducts) are removed from the reactor 814. The system 800 is similar to the system 700 for FIG. 7, but system 800 is shown as including a plurality of vessels 820, 821, 822 that can act as hydraulic drive columns for driving the hydroelectric drive system 811.

In the system 800, energy produced by a supercritical water reactor 814 is used to drive a hydroelectric drive system 811 to produce electrical power and in which reaction byproducts (e.g., solid, particulate, and soluble byproducts) are removed from the reactor 814. The system 800 includes a plurality of pressure vessels 820, 821, 822, like the pressure vessel 720 of FIG. 7, and each pressure vessel 820, 821, 822 includes a hollow interior cavity defined by one or more inner walls of the vessel.

The hollow interior cavities of the vessel vessels 820, 821, 822 are configured to include liquid (e.g., water) 832, 842, 852 and an air pocket or a head space 803, 813, 823 above the liquid 832, 842, 852. The liquid 832, 842, 852 in a vessel 820, 821, 822 can be cycled between an upper level L1 and a lower level L2 by controlling a variable volume of liquid in the vessel. Additionally, the pressure of gas in the air pocket 803, 813, 823 and of the liquid 832, 842, 852 in a vessel 820, 821, 822 can be controlled by controlling an amount of gas that is injected into the air pocket 803, 813, 823. For convenience, ports and valves for controlling the amount, and pressure of, gas and liquid in each vessel 820, 821, 822 are not shown in FIG. 8, but the system 800 can include ports and valves similar to those of system 700. In some implementations, check valves can be used to control the flow of water out of vessels 820, 821, 822 to the hydroelectric drive system 811 and to control the flow of water from the de-sanding cyclone 810. For example, a first check valve associated a vessel 820, 821, 822 can open when a pressure differential between a vessel pressure and a hydroelectric drive system pressure exceeds a predetermined first threshold and close when the pressure differential falls below the first threshold, and a second check valve associated a vessel 820, 821, 822 can open when a pressure differential between the hydroelectric drive system pressure or a de-sanding cyclone pressure exceeds a predetermined second threshold and close when the pressure differential falls below the second threshold. Valves under active control by the controller 855 may be used to control the flow of high-pressure, high-temperature liquid into the vessels 820, 821, 822 and to control the flow of gas out of the vessels 820, 821, 822 to the condenser 825.

As with the vessel 720, each vessel 820, 821, 822 can operate as a hydraulic drive piston to provide pressurized water to the hydroelectric drive system 811, where the water is pressurized by energy received from the reactor in the form of hot, pressurized (e.g., supercritical) water that is injected into the head space 803, 813, 823 of a vessel. Each vessel 820, 821, 822 can provide pressurized water to the hydroelectric drive system 811. After the pressurized water has passed through the hydroelectric drive system 811, it can drop into a collector launder 812. From the collector launder 812, the exhaust water from the hydroelectric drive system 811 can be fed through a de-sanding cyclone 810 that collects solids and/or mineral crystals that were transmitted from the reactor 814 through the vessels 820, 821, 822 and through the hydroelectric drive system 811. The collected solids and/or mineral crystals can be deposited into a storage tank 871.

Filtered and demineralized water then can flow from the de-sanding cyclone 810 back to the vessels 820, 821, 822 to refill the vessels. In an implementation, the hydroelectric drive system 811 and/or the de-sanding cyclone 810 can be located at a higher level than vessels 820, 821, 822, so that water for refilling the vessels 820, 821, 822 can be fed gravitationally from the cyclone 810 to the vessels 820, 821, 822. In some implementations, the hydroelectric drive system 811, the launder 812 and/or the de-sanding cyclone 810 can be maintained at a pressure greater than atmospheric pressure (e.g., greater than 25 psi or 10 psi above atmospheric pressure) to provide additional pressure to the water that refills the vessels 820, 821, 822. Refilling a vessel 820, 821, 822 with water reduces the volume of the air pocket 803, 813, 823 in the vessel and pushes out steam and vapor from the air pocket 803, 813, 823 to a condenser 825, where it is cooled to become pure water liquid. In some implementations, the condensed water from the condenser 825 can be stored in a tank 815 for reuse in the system 800. In some implementations, the condensed water can be exported to outside water users or utilities.

Liquid from vessels 820, 821, 822 also can be output to a reverse osmosis filter unit 873 that is configured to filter out the buildup of salts and acids (e.g., sulfuric acid) from liquid 832, 842, 852 in the vessels 820, 821, 822. A portion of high-pressure water can be bled from a column of water 832, 842, 852 when the column is pressurized and sent forward to reverse osmosis filter unit 873 for filtering, and filtered water from the reverse osmosis unit can be stored in a storage tank 875.

A controller 855 can monitor water levels L1, L2, and L3, as well as temperatures and pressures in each of the vessels 820, 821, 822. The controller 855 can then determine an amount of pressurized water from to meter from the reactor 814 into each vessels 820, 821, 822 based on these inputs. For example, the controller 855 can control one or more control valves to control operation of the system 800.

The controller 855 can control operation of the system 800, such that each of the different vessels 820, 821, 822 provide pressurized water to the hydroelectric drive system 811 at different times within a time period of a cycle. For example, in a three second time. Different vessels 820, 821, 822 can provide pressurized water to the drive system 811 beginning at times that are spaced 1.0 second apart from each other, so as to continuously provide pressurized water to the drive system 811, even when one or more of the plurality of vessels is being refilled and/or is under relatively low pressure. For example, as shown in FIG. 8, at a particular time in the cycle: vessel 820 can be in a state in which high-temperature, high-pressure water from the reactor 814 is just beginning to enter the air pocket 803 above the water 832 in vessel 820, with the water 832 having a level L1, to pressurize the water 832 that will be provided to drive system 811; vessel 822 can be in the state in which it has just finished providing high-pressure water from the vessel 822 to the drive system 811, with the water 852 in vessel 822 having a level L2, and vessel 821 can be in a state in which it is in the process of being refilled with water 842 received from the cyclone 810, with the water 842 having a level L3 that is between levels L1 and L2.

Figure 9:
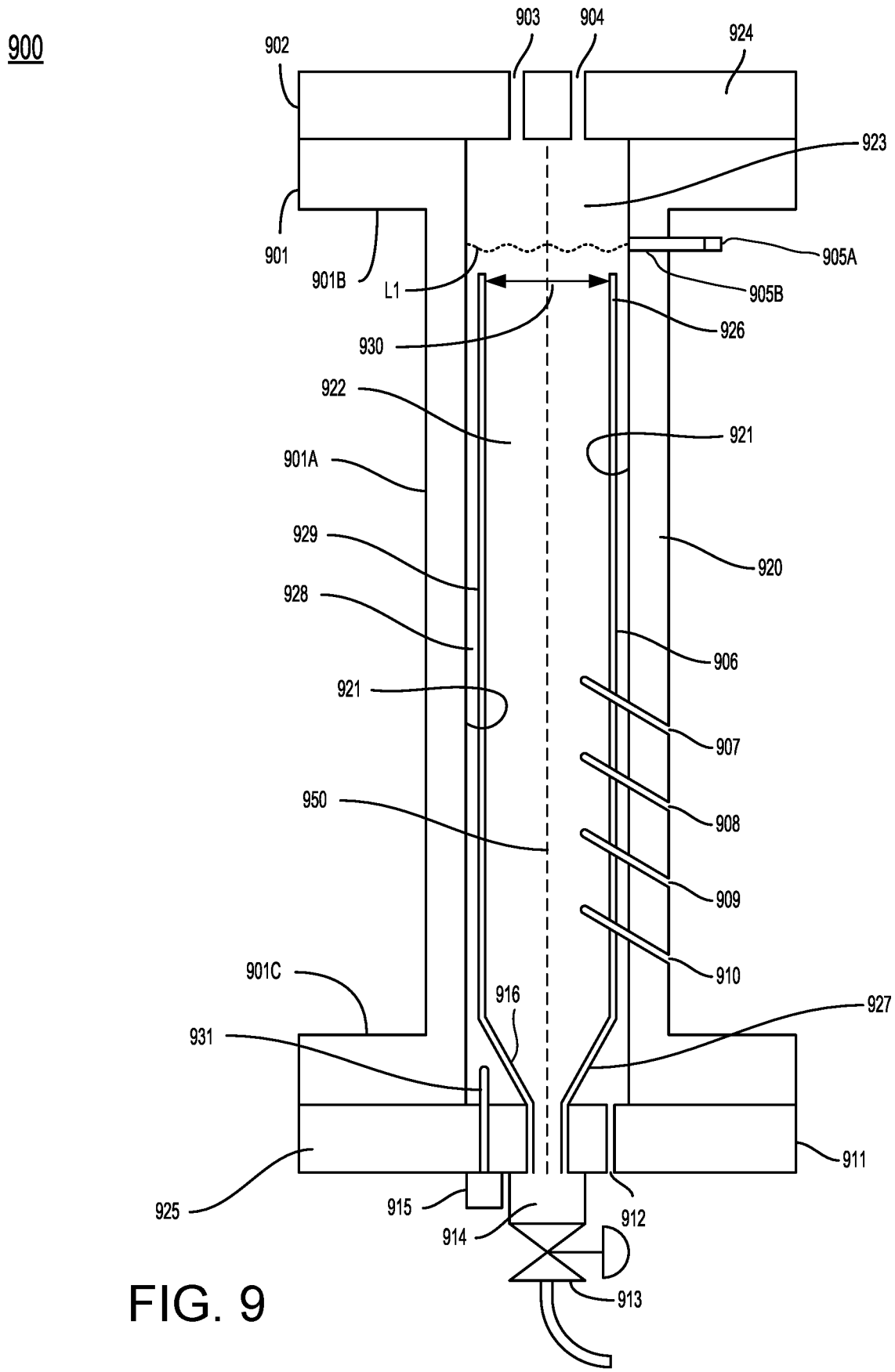
FIG. 9 is a schematic sectional view of a reaction chamber for use in a high-pressure, high-temperature reactor, such as, for example, a supercritical water oxidation reactor.

FIG. 9 is a schematic sectional view of a reaction chamber 900 for use in a high-pressure, high-temperature reactor, such as, for example, a supercritical water oxidation reactor. The reaction chamber 900 can be configured to receive air, water, fuel gas, liquid fuel, and fuel slurries and for the fuel to be combusted within the reaction chamber at high pressure (e.g., greater than 1500 psi, 2500 psi, 3200 psi, 4000 psi) and high temperature (e.g., greater than 300° C., 370° C. 400° C., 500° C.). The reactor chamber 900 can include an outer vessel 901 having one or more strong, robust outer walls 920 capable of withstanding pressure differentials of greater than, for example, 2500 psi, 3200 psi, 4000 psi, 5000 psi, and an inner vessel 906, located within the one or more outer walls 920 of the vessel 901. The inner vessel 906 can be separated from one or more interior surfaces of the outer vessel 901 by a gap. Combustion reactions can occur inside of the inner vessel 906, and the inner vessel 906 can include nonreactive materials, e.g., surfaces, that are relatively unaffected by the high temperature reactions that occur within the inner vessel 906. Nonreactive materials of the inner vessel 906 can include, for example, glass and/or ceramic material.

In some implementations, the outer vessel 901 can include a cylindrical section (e.g., a casting, or a welded pipe assembly) 901A and can be provided with flanges 901B, 901C or other means of closure. In some implementations, the outer vessel 901 can be closed by a blind flange arrangement or bolt-on high-pressure cylinder heads 902, 911 closing the top and bottom of the outer vessel 901, respectively. A wall 920 of the outer vessel 901 can be made of one or more materials and have dimensions (e.g., a thickness), such that the outer vessel 901 can withstand a predetermined threshold pressure within the reaction chamber 900 when the chamber is used for high-pressure, high-temperature combustion of fuel. For example, the predetermined threshold pressure can be equal to a standard, or maximum, operating pressure of the reaction chamber 900 plus a margin of safety. Walls 920 of the outer vessel 901 can include metal. In some implementations, one or more walls 920 of the outer vessel 901 can include a combination of metal (e.g., stainless steel) and glass or carbon fiber or metal fiber wrapping. The one or more walls 920 of the outer vessel can be wrapped in a thermal insulation layer to protect the metal and/or carbon fiber from digestion.

In some implementations, an inner surface 921 of a wall 920 of the outer vessel 901 can include corrosion-resistant steel or a composite material. In some implementations, the inner surface 921 of a wall of the outer vessel 901 can be lined (e.g., plated) with a corrosion-resistant surface material, such as, for example, ceramic, PTFE, etc.

A hollow interior cavity of the reaction chamber 900 can be defined by walls 920 of the outer vessel 901. Within the hollow interior cavity, the outer vessel 901 can include a liquid 922 and an air pocket 923 above the liquid, with a top 924 of the outer vessel 901 being located above the air pocket and a bottom 925 of the outer vessel being located below the liquid 922. In some implementations, for example, for a generally cylindrical cavity, the cavity can have an axis 950 that extends along a length of the cavity between the top 924 of the vessel 901 and the bottom 925 of the vessel.

The liquid 922 within the hollow cavity of the outer vessel 901 can have a level L1 within the hollow cavity during operation of the reactor chamber 900. The outer vessel 901 includes gas ports 903, 904 through the top 924 from the air pocket 923 to an exterior of the outer vessel 901. The outer vessel 901 can include gas ports 907, 910 between an exterior of the outer vessel 901 and a portion of the hollow cavity that is below level L1 within the hollow cavity. Gas ports 907, 910 can be defined, for example, through a wall of the cylindrical section 901A of the outer vessel 901. In addition, the outer vessel 901 can include liquid ports 908, 909 between an exterior of the outer vessel 901 and a portion of the hollow cavity that is below level L1 within the hollow cavity. In an implementation, liquid ports 908, 909 can be defined through a wall of the cylindrical section 901A of the outer vessel and can be located vertically between gas ports 907 and 910.

The inner vessel 906, located within the hollow cavity defined by the walls of the outer vessel 901, can have a top or upper portion 926 and a bottom or lower portion 927. As shown in FIG. 9, the upper portion 926 is closer to the top of the outer vessel 901 than to the bottom of the outer vessel 901, and the lower portion 927 is closer to the bottom of the outer vessel 901 then to the top of the outer vessel 901. The top portion 926 of the inner vessel 906 can have a diameter or cross-sectional area that is larger than the diameter or cross-sectional area of the bottom portion 927 of the inner vessel 906, and a diameter or cross-sectional area of the inner vessel 906 can taper (e.g., in a funnel shape) from a first size at the top portion 926 to a second, smaller size at the bottom portion 927. The taper can occur over all, or a portion 916, of a length of the vessel between the top of the vessel and the bottom of the vessel. In example implementations, the inner vessel 906 can being arranged along an axis, e.g., along a length of the inner vessel 906 between its top portion 926 and is bottom portion 927, where that axis is generally parallel to, or co-extensive with, the axis 950 of the outer vessel 901.

The inner vessel 906 can be made of, or include surfaces having a, nonreactive material (e.g., glass or ceramic material) that is also capable of withstanding the high temperatures that exist within the reaction chamber 900 during operation of the chamber, e.g., when fuel is combusted at high pressures and temperatures within the chamber. A bottom portion 927 of the inner vessel 906 can be fixedly attached to the bottom 925 of the outer vessel 901, and the inner vessel 906 can have dimensions, and be located, such that a gap (e.g., a water jacket space) 928 exists between an outer wall 929 of the inner vessel 906 and the inner wall 921 of the outer vessel 901. In some implementations, the position of the inner vessel 906 with respect to one or more inner walls 921 of the outer vessel can be defined and/or stabilized by one or more wires, rods, protrusions, etc. from an outer wall of the inner vessel, but the water jacket space 928 between the inner vessel 906 and the outer vessel 901 is generally open for water to flow freely in the space 928.

The reaction chamber 900 can include a port 915, which can be a sealed port, and an electric rod heater 931 can be provided through the port 915 into the interior of the reaction chamber 900, where the rod heater 931 can provide heat to initiate reactions within the reaction chamber 900, before the reactions inside the chamber become self-sustaining. The rod heater 931 that is provided through port 915 can provide heat in the water jacket space between the outer vessel 901 and the inner vessel 906, where the heat is then distributed throughout the interior of the chamber by the water 922 that floods the outer and inner vessels 901, 906.

During operation of the reactor chamber 900, air (e.g., oxygen and nitrogen) can be injected into the inner vessel 906 through gas ports 907 and 910. Fuel gas, for example, natural gas biogas sour gas sweet gas, etc. can be injected into the inner vessel 906 through port 909. Slurry and/or liquid fuels can be injected into the inner vessel 906 through port 908.

Water can be injected into the reaction chamber 900 through port 912, which opens into the reaction chamber 900 inside of the outer vessel 901 but outside of the inner vessel 906. High pressure water can be drained from the reaction chamber 900 through port 914, which drains water from the interior of inner vessel 906, where control valve 913 can control the rate of outflow of water through port 914. The high pressure water that is extracted from the reaction chamber through port 914 can be used, for example, to drive a hydroelectric drive system, to pressurize a gas or liquid charging system, etc. Water can be injected through port 912 into the reaction chamber 900 at a rate that matches the rate at which water is extracted from the chamber through port 914, so as to maintain a water level L1 inside the reaction chamber during operation. The level L1 of the water can be sensed by a sensor 905A that, in some implementations, can be located outside of the outer vessel 901 and that can sense (e.g., optically, ultrasonically, etc.) the level L1 of the water through a port 905B in a side wall of the outer vessel.

When water is injected through port 912 into the water jacket space between the outer vessel 901 and the inner vessel 906, the water can flow up through the water jacket space 928 from the bottom of the outer vessel toward the top of the outer vessel 901. When the water level L1 is at or above a top of the inner vessel 906, the water injected through port 912 can flow up through the water jacket space 928 around the walls of the inner vessel 906 and then flow into the interior of the inner vessel through the opening 930 of the inner vessel at the top portion 926 of the inner vessel.

As fuel is combusted within the interior of the inner vessel 906, hydrogen released from reacted hydrocarbon chains in the fuel that is combusted within the inner vessel 906 bonds with oxygen from the air that is injected into the inner vessel 906 to create new water molecules as a byproduct of the reactions within the inner vessel. The water and other reaction byproducts can be flushed from the inner vessel 906 through the liquid port 914. Carbon released from hydrocarbon chains that are combusted within the inner vessel 906 can bond with oxygen from the air that is injected into the inner vessel 906 to produce carbon dioxide. This carbon dioxide, water vapor, and other gaseous reaction byproducts can exit the reaction chamber 900 through gas port 903. Control valves in equipment external to the reaction chamber 900 can control the release of gaseous reaction byproducts through port 903, so as to maintain a desired pressure within the reaction chamber 900. Gas port 904 can be connected to a rupture disc for a pressure relief valve external to the reaction chamber 900, such that if the pressure within the hollow cavity of the outer vessel 901 exceeds a threshold value, gas can be released through gas port 904, so that pressure within the reaction chamber 900 does not exceed a critical value.

Figure 10:
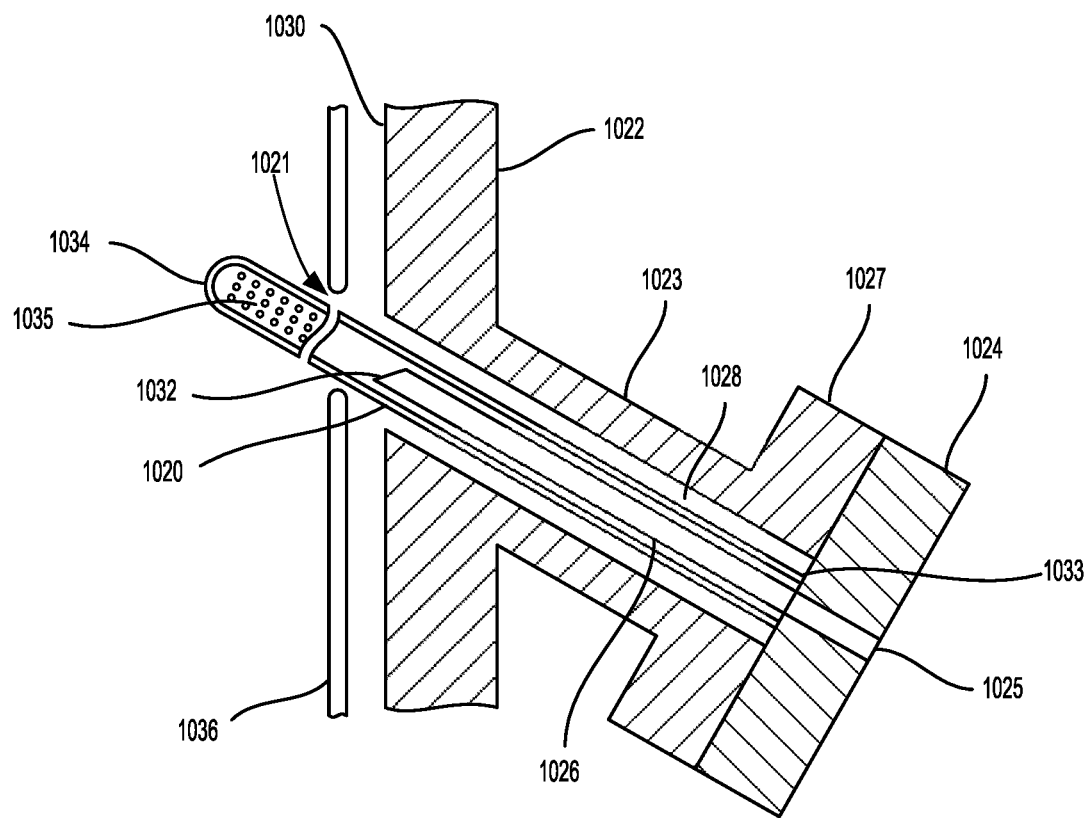
FIG. 10 is a schematic side view of a port through which gas can be provided from an exterior of the reaction chamber into an interior of the inner vessel of the reaction chamber.

FIG. 10 is a schematic side, sectional view of a port 1000 (e.g., port 907, 908, 909, 910) through which gas (e.g., air or fuel gas) or liquid can be provided from an exterior of the reaction chamber 900 into an interior of the inner vessel 906. The port can include a nozzle 1023 that protrudes outward from an outer wall 1022 of the outer vessel 901. The nozzle 1023 can include a hollow inner channel (e.g., a generally cylindrical channel) 1028 along an axis of the nozzle, where the inner channel 1028 is open to an interior of the outer vessel 901 within an inner wall 1030 of the outer vessel. A flange 1027 can exist at an outer end of the nozzle 1023. A blind flange 1024 can attach to the flange 1027 at the end of the nozzle 1023, and the blind flange can include a port 1025 that couples the channel 1028 to the exterior of the outer vessel 901.

A first hollow tube 1026 located within the hollow channel 1028 can be attached to the blind flange 1024 and can provide a conduit for air, gas, liquid, or slurry fuel to be supplied from outside of the outer vessel to inside the outer vessel. The first hollow tube 1026 can be made of materials (e.g., stainless steel) similar to the materials of one flange 1024 and/or can have thermal properties (e.g., thermal expansion properties) similar to those of the blind flange 1024. The first hollow tube 1026 can extend from the blind flange 1024 toward the interior of the outer vessel, and the first tube 1026 can be open at an end 1032 to allow air, gas, or fuel that passes through the tube to be emitted from the tube into the interior of the outer vessel. For example, in one implementation, the first hollow tube 1026 can extend approximately as far as the inner wall 1030 of the outer vessel.

A second hollow tube 1020 can fit over the first hollow tube 1026 and provide an additional conduit through which air, gas, fuel, etc. can propagate from outside of a reaction chamber to inside the chamber, after the air, gas, fuel has exited the first hollow tube 1026. The second hollow tube 1020 can be fabricated of nonreactive materials that are tolerant to very high temperatures that may exist within the reaction chamber 900. The materials of the second hollow tube 1020 can include, for example, glass or ceramic materials. The second hollow tube 1020 can fit over the first hollow tube 1026 with sufficient clearance between the two tubes 1020, 1026 to allow for thermal expansion of one or both of the tubes during operation of the reaction chamber. In some implementations, a first end 1033 of the second hollow tube 1020 can be fixedly attached to the blind flange 1024, so as to prevent or impede the escape of gas and/or liquid introduced through first hollow tube 1026 at a joint between the end first 1033 of the second hollow tube 1020 and the blind flange 1024. In some implementations, the first end 1033 of the second hollow tube 1020 can be coupled to the blind flange 1024, for example, by the force of gravity acting on the tube 1020, such that the tube 1020 rests on an inner surface of the blind flange 1024. In some implementations, one or more spacers (e.g., washers, beads, protrusions, etc.) between the two hollow tubes 1020 and 1026 can maintain a predetermined separation and a rotational orientation and alignment between the tubes.

The second hollow tube 1020 can extend further away from the blind flange 1024 than the first hollow tube 1026, and the second hollow tube can extend into an interior of the inner vessel 906. For example, the second hollow tube 1020 can extend through an opening 1021 in a wall 1036 of the inner vessel such that a second end 1034 of the second hollow tube 1020 is located within an interior of the inner vessel is defined by one or more walls 1036 of the inner vessel. A size of the opening 1021 relative to a diameter of the second hollow tube 1020 can be selected to allow tube 1020 to fit through the opening 1021 at the expected range of temperatures at which the reaction vessel 900 is operated.

The second end 1034 of the second hollow tube 1020 can include one or more openings 1035 through which air, gas, or fuel that is introduced from the exterior of the reaction chamber through port 1025 and tube 1026 can be emitted from the second hollow tube into the inside of an inner vessel 906, i.e., on a side of wall 1036 distal to end flange 1024. In some implementations, the second hollow tube 1020 can be angled upward, relative to a direction of gravity, from its first end 1033 to its second end 1034, so that air and gas emitted from end 1032 of first hollow tube 1026 into the second hollow tube 1020 tends to bubble upward toward the second end 1034 and then out through openings 1035 when the tube 1020 is bathed in liquid, for example, during normal operating conditions of the reaction chamber 900. With the second hollow tube 1020 extending further away from the blind flange 1024 than the first hollow tube 1026, the end 1035 of the second hollow tube 1020 from which air and/or fuel is emitted into the vessel can be located closer to combustion sites within the chamber and at higher temperature portions of the reaction chamber than the opening 1032 of the first hollow tube 1026. However, the nonreactive, high-temperature materials of the second hollow tube can be more resilient to high-temperature combustion reactions than the materials of the first hollow tube and therefore can protect the first hollow tube from damage.

The one or more openings 1035 can be arranged and oriented such that the air, gas, or fuel that is emitted through the openings exits the second hollow tube with a direction and velocity having a component in an azimuthal direction within the inner vessel (i.e., in a direction neither parallel to a direction along an axis of the vessel, nor parallel to a radial direction extending radially away from an axis of the vessel).

Figure 11:
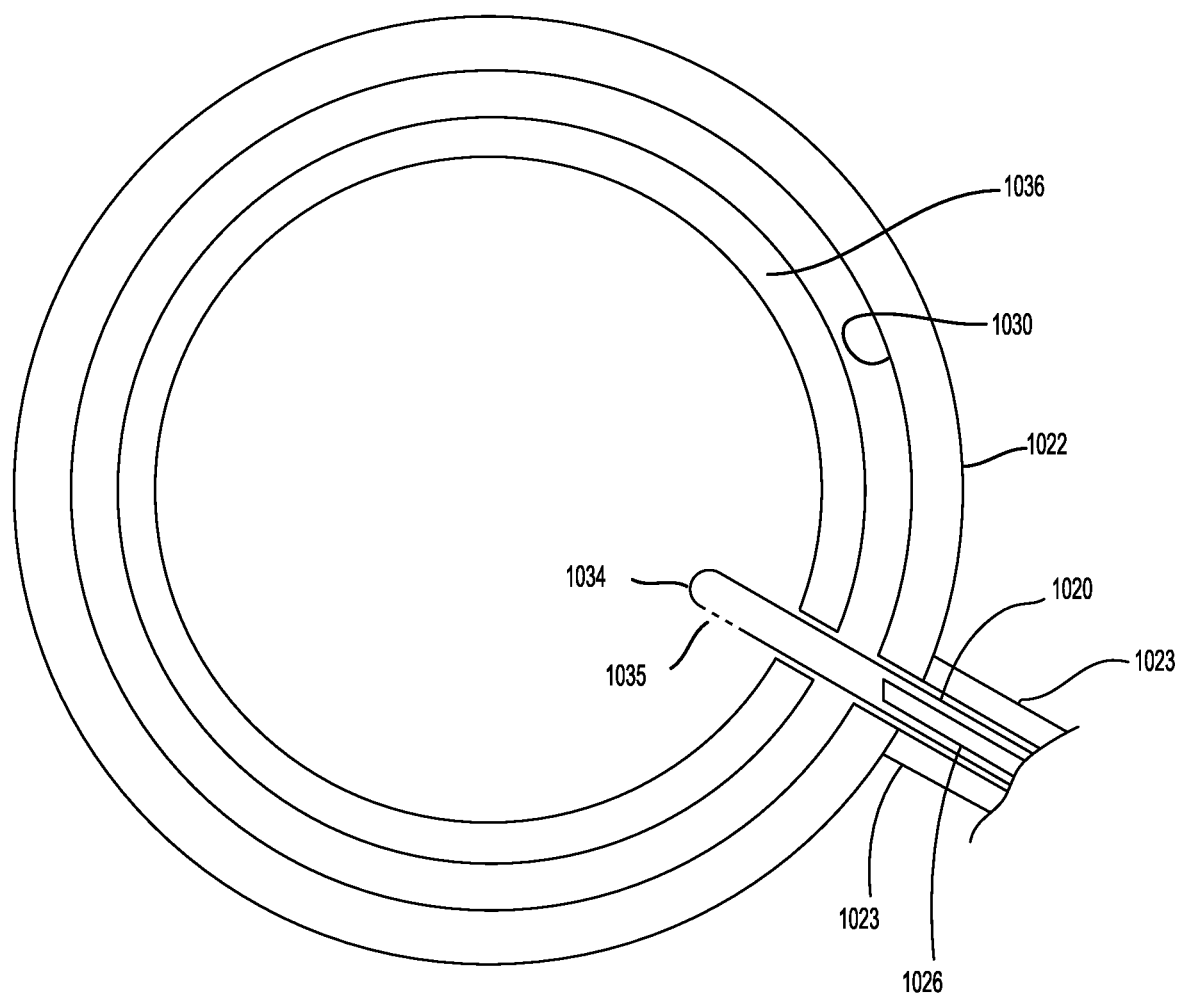
FIG. 11 is a schematic top view of a hollow tube when the tube protrudes through an outer wall and inner wall of an outer vessel of a reaction chamber and through an inner vessel the reaction chamber so that an end of the hollow tube is located within the inner vessel.

FIG. 11 is a schematic top view 1100 of the second hollow tube 1020 when it protrudes through outer wall 1022 and inner wall 1030 of an outer vessel and through an inner vessel 1036 so that the second end 1034 of the second hollow tube is located within the inner vessel 1036. The second hollow tube 1020 can fit over the first hollow tube within a channel of the nozzle 1023. As shown in FIG. 11, openings 1035 can be located along a side wall proximate to the second end 1034 of the second hollow tube 1020, so that air, gas, or fuel is emitted in a direction having an azimuthal component within the inner vessel. Because of the direction in which air, gas, or fuel exits the one or more openings 1035 of the second hollow tube 1020, angular momentum can be imparted by the air, gas, or fuel to the liquid within the inner vessel to create a cyclonic rotation in the liquid within the inner vessel.

Referring again to FIG. 9, such a cyclonic rotation in the liquid 922 can cause the liquid to rotate about the axis 950, such that the rotating liquid acts like a centrifuge to concentrate relatively lighter, less dense materials (e.g., oxygen and hydrocarbons) proximate to the axis 950 and to concentrate heavier, denser materials (e.g., salts, minerals, oxides, and solids) away from the axis, nearer to walls of the inner vessel 906. Because of this, exothermic combustion reactions involving hydrocarbons are concentrated closer to the axis 950, while heavier reaction byproducts, such as salts, minerals, oxides, and solids migrate away from the central axis 950 toward walls of the inner vessel, while also falling due to gravity toward the lower portion 927 of the inner vessel 906, where they then can be flushed from the vessel through port 914 after falling through the tapered portion of the inner vessel.

Because of the density gradient due to the cyclonic rotation induced in liquid 922 and exothermic reactions occurring preferentially nearer to the axis 950, a radial temperature gradient can also exist within reaction chamber 900. The radial temperature gradient also can be created by the water introduced at low temperature (e.g., less than 100° C.) though port 912, which then flows through the water jacket space 928 between the inner vessel 906 and the outer vessel 901. The incoming water can enter the inside of the inner vessel 906 primarily through opening 930, with some water entering the inside of the vessel from the jacket space 928 though openings 1021 (e.g., as shown in FIG. 10) in a wall of the vessel 906 through which second hollow tubes 1020 pass. The radial temperature gradient caused by the cyclonic rotation within the liquid 922 and the incoming water flowing in the water jacket space 928 can result in a temperature at inner walls 921 of the outer vessel 901 that is sufficiently low to mitigate against corrosion of the inner wall by high-temperature reactions occurring within the chamber 900 and also can permit walls of the outer vessel 901 to be relatively thin compared to conventional high-temperature, high-pressure reaction vessels.

Figure 12:
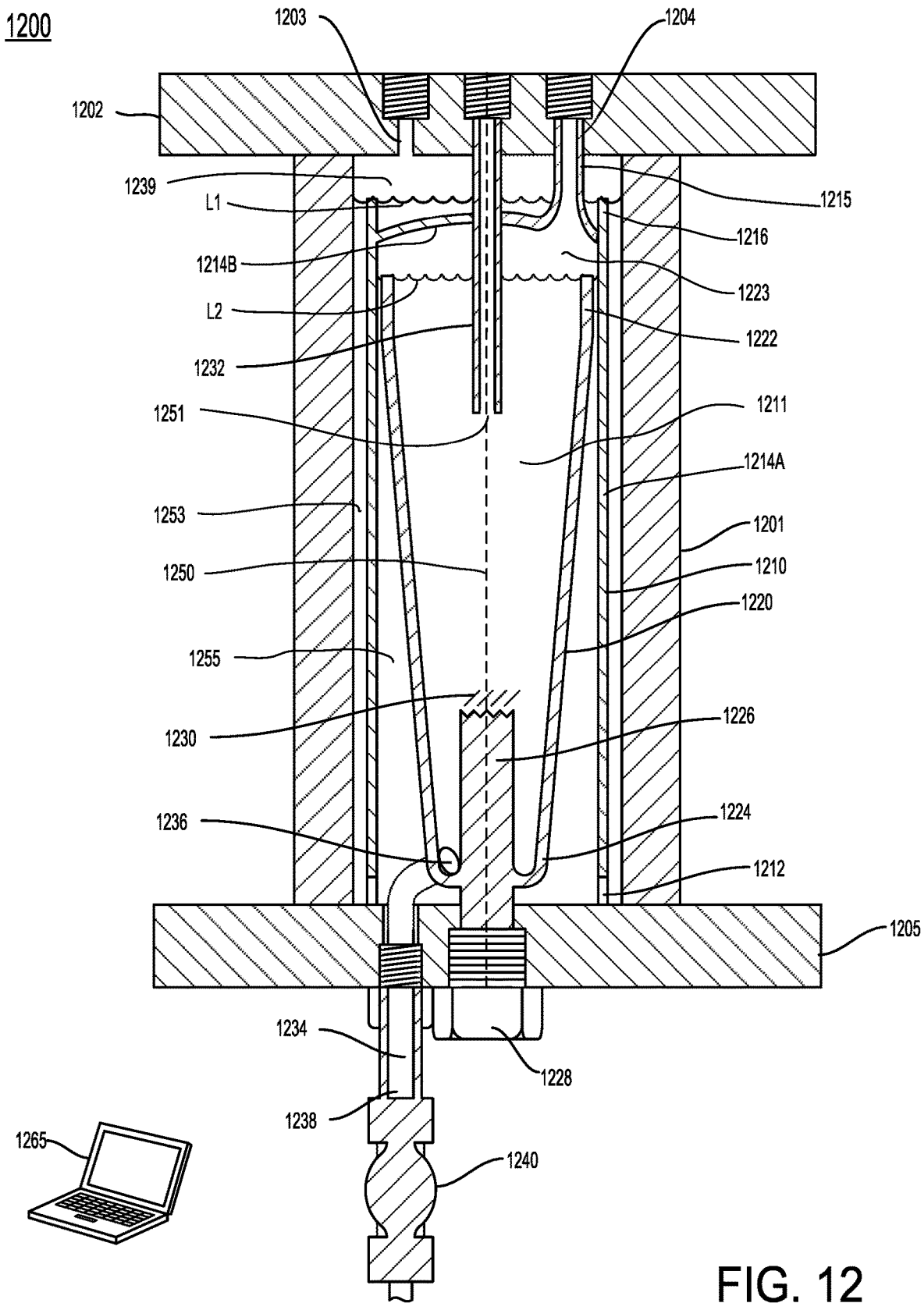
FIG. 12 is a schematic sectional view of a reaction chamber for use in a high-pressure, high-temperature reactor, such as, for example, a supercritical water oxidation reactor.

FIG. 12 is a schematic sectional view of another reaction chamber 1200 for use in a high-pressure, high-temperature reactor, such as, for example, a supercritical water oxidation reactor. The reaction chamber 1200 can be configured to receive air, water, fuel gas, liquid fuel and fuel slurries and for the fuel to the combusted within the reaction chamber at high pressure (e.g., greater than 1500 psi, 2500 psi, 3200 psi, 4000 psi) and high temperature (e.g., greater than 300° C., 370° C., 400° C.). The reactor chamber 1200 can include an outer vessel 1201 having one or more strong, robust outer walls capable of withstanding pressure differentials of greater than, for example, 1500 psi, 2500 psi, 3200 psi, 4000 psi, 5000 psi, and two or more nested inner vessels 1210, 1220, located within the outer vessel 1201. An intermediate inner vessel 1210 can be separated from one or more interior surfaces of the outer vessel 1201 by a first gap or water jacket space, and a central inner vessel 1220 can located within the intermediate inner vessel 1210 and can be separated from one or more interior surfaces of the intermediate inner vessel 1210 by a second gap or water jacket space. Combustion reactions can occur inside of the central inner vessel 1220, and the inner vessels 1210, 1220 can include nonreactive materials, e.g., surfaces, that are relatively unaffected by the high temperatures caused by reactions that occur within the central inner vessel 1220. Nonreactive materials of the inner vessels 1210, 1220 can include, for example, glass and ceramic material.

In some implementations, the outer vessel 1201 can include a cylindrical section (e.g., a casting, or a welded pipe assembly) and can be closed by blind flanges or bolt-on, high-pressure cylinder heads 1202, 1205 closing the top and bottom of the vessel 1201, respectively. Walls of the outer vessel 1201 can be made of one or more materials and dimensions (e.g., a thickness), such that the outer vessel 1201 can withstand a predetermined threshold pressure within the reaction chamber 1200 when the chamber is used for high-pressure, high-temperature combustion of fuel. For example, the predetermined threshold pressure can be equal to a standard, or maximum, operating pressure of the reaction chamber plus a margin of safety. A hollow interior cavity can be defined by walls of the outer vessel 1201. In some implementations, one or more walls of the outer vessel 1201 can include a combination of metal (e.g., stainless steel) and carbon fiber or fiberglass or metal fiber wrapping. The one or more walls of the outer vessel 1201 can be wrapped in a thermal insulation layer to protect the metal and/or carbon fiber from the digestion. In some implementations, for example, for a generally cylindrical cavity, the cavity can have an axis 1250 that extends along a length of the cavity between a top of the vessel 1201 and a bottom of the vessel.

The reactor chamber 1200 can include an intermediate inner vessel 1210 located within the hollow cavity defined by the walls of the outer vessel 1201. The intermediate inner vessel 1210 can include side walls 1214A and a lid 1214B attached to side walls. In some implementations, the side walls 1214A and the lid 1214B can be formed as a single part (e.g., as a glass or ceramic jar). Side walls 1214A can include portions 1216 that extend to a first height above a height of the lid 1214B. Side walls 1214A and lid 1214B can be impermeable to liquid. A bottom portion of the side walls 1241A, adjacent to the bottom blind flange 1205, can include one or more openings 1212 in the side walls through which liquid can flow. The lid 1214B can include, or can be attached to, a vent port 1215 through which gas can flow.

The reactor chamber 1200 can include a central inner vessel 1220 located within the hollow cavity defined by the walls of the outer vessel 1201 and nested within the intermediate inner vessel 1210, for example, within the lid 1214B and the walls 1214A of the intermediate inner vessel. A top portion 1222 of the central inner vessel 1220 can have a diameter or cross-sectional area that is larger than the diameter or cross-sectional area of the bottom portion 1224 of the central inner vessel 1220. A diameter or cross-sectional area of the central inner vessel 1220 can taper from a first size at the top portion 1222 to a second, smaller size at the bottom portion 1224. The central inner vessel 1220 can have an axis along its length between its top and bottom portions, where the axis is generally parallel to, or co-extensive with, the axis 1250 of the outer vessel 1201. The central inner vessel 1220 can include a central post 1226 that can be located, for example, along an axis of the central inner vessel 1220. The central post 1226 can be integrally connected to the walls of the central inner vessel 1220. The central inner vessel 1220 can be attached to the outer vessel 1201 to hold the central inner vessel 1220 in place relative to the outer vessel. For example, the central post 1226 can be connected to a bottom flange 1205 of the outer vessel.

The inner vessels 1210, 1220 can be made of, or include surfaces having a, nonreactive material (e.g., glass or ceramic material) that is also capable of withstanding the high temperatures that exist within the reaction chamber 1200 during operation of the chamber when fuel is combusted at high pressures and temperatures within the chamber.

Liquid 1211 can be contained with the hollow interior cavity, and the liquid can envelope outer walls of the nested inner vessels 1210, 1220. For example, liquid 1211 can have a level L1 outside of the inner vessels 1210, 1220 and level L2 inside of the inner vessels 1210, 1220, where L2 is lower than L1. A first air pocket 1223 can exist inside the intermediate inner vessel 1210 above the liquid level L2 in the vessel 1210, and a second air pocket 1239 can exist outside the intermediate inner vessel 1210 above the liquid level L1 in the vessel 1201.

The reaction chamber 1200 can include a liquid input port 1203 through which liquid (e.g., water) can be injected into the hollow cavity formed by the outer vessel 1201. The reaction chamber 1200 can include a first liquid output port 1234 through which liquid and reaction byproducts can be flushed from the reaction chamber. For example, the first liquid output port can have a first opening 1236 within the central inner vessel 1220 and a conduit from the first opening 1236 to a second opening 1238 outside of the outer vessel 1201, so that liquid and reaction byproducts from within the central inner vessel 1220 can be flushed from within the vessel 1220 to outside outer vessel 1201. The pump 1240 can pump contents within the first liquid output port 1234 for further processing within a system that includes the reaction chamber 1200. For example, contents within the first liquid output port 1234 can be pumped to a dedicated drive column for processing of the reaction-byproduct-rich material that is flushed out of the inner vessel 1220 through the port 1234.

The reaction chamber 1200 can include a second liquid output port 1232 through which liquid and reaction byproducts can be extracted from the reaction chamber. For example, the second liquid output port 1232 can extend from the top flange 1202 through the lid 1214B of the intermediate inner vessel and into liquid 1211 contained within the central inner vessel 1220. Thus, liquid 1211 can enter a first opening 1251 of the second liquid output port 1232. The first opening 1251, in some implementations, can be located on a central axis 1250 of the central inner vessel 1220. When a cyclonic rotation is created in the liquid 1211, liquid received through the first opening 1251 can be relatively free of dense reaction byproducts (e.g., salts and minerals) and thus mineral-poor, as compared with mineral-rich liquid received through opening 1236 of first liquid output port 1234, where the opening 1236 is located at a bottom portion 1224 of the central inner vessel 1220 and is located away from the central axis 1250. The second liquid output port 1232 can pass through top flange 1202, such that liquid received through opening 1251 can be extracted out of the reaction chamber 1200 for use in other portions of a system that includes the reaction chamber 1200. For example, high-pressure liquid received through second liquid output 1232 port can be direction to a hydroelectric drive system to generate electrical power.

The reaction chamber 1200 can include an input port 1228 for providing air, fuel gas, and liquid or slurry fuel to within the central inner vessel 1220. The input port 1228 can pass through in some implementations, the input port bottom flange 1205, and up through post 1226, to outlets or nozzles 1230 that emit the air, fuel gas, and liquid or slurry fuel to within the central inner vessel 1220. Outlets or nozzles 1230 can be configured to emit the air, fuel gas and/or liquid or slurry fuel into the central inner vessel 1220 with directions and velocities that impart angular momentum to the liquid 1211 about the central axis 1250 to create a cyclonic rotation in the liquid 1211. For example, outlets or nozzles can be located a distance away from the axis of the inner vessel and can configured to emit air, fuel gas, and/or liquid or slurry fuel into the vessel 1220 in a direction having an azimuthal component. In an implementation, different outlets or nozzles 1230 can be used to supply different ones of the air, fuel gas, and/or liquid or slurry fuel to the central inner vessel 1220. In an implementation, outlets or nozzles 1230 can include openings of different concentric tubes located on the axis of the vessel 1220, with the different tubes supplying different ones of the of the air, fuel gas, and/or liquid or slurry fuel to the central inner vessel 1220. Thus, at least some of the concentric tubes can be arranged as rings around other tubes, with the rings supplying air, fuel gas, and/or liquid or slurry fuel to the vessel a distance away from the axis of the vessel 1220. The air, fuel gas, and/or liquid or slurry fuel supplied to the vessel a distance away from the axis can be supplied in a direction having an azimuthal component to cause the cyclonic rotation within the vessel. For example, a concentric tube arranged as a ring can include one or more angled slats at an opening of the tube into the vessel to cause the air, fuel gas, and/or liquid or slurry fuel to be emitted from the ring into the vessel in a direction that is non-parallel to the axis of the vessel.

During operation of the reaction chamber 1200, liquid levels L1 and L2 can be maintained within the hollow cavity within the vessels 1201, 1210, 1220 by controlling flow rates of liquid into and out of the reaction chamber and by controlling pressures of air pockets 1223 and 1239. Liquid (e.g., water) can enter into the hollow cavity through liquid input port 1203 and exit out of the hollow cavity through liquid outlet ports 1232 and 1234. Liquid inlet port 1203 can be located at a radial position a distance away from the axis 1250, but can be located closer to the axis than the portions 1216 of the sidewalls 1214A of the intermediate inner vessel that extend above the lid 1214B of the intermediate inner vessel. Thus, the liquid entering through port 1203 can cover the lid 1214B and then overflow the portions 1216 and descend through a first water jacket space 1253 between the outer vessel 1201 and the intermediate inner vessel 1210. Liquid can flow through openings 1212 at a bottom of the intermediate inner vessel 1210 and then up through a second water jacket space 1255 between the intermediate inner vessel 1210 and the central inner vessel 1220. From the second water jacket space 1255, liquid can overflow a top portion 1222 of the central inner vessel 1220 to enter the inside of the central inner vessel 1220. From the inside of the central inner vessel 1220, liquid can flow out of the reaction chamber 1200 through ports 1232 and 1234.

Liquid (e.g., water) can have an initial temperature when it enters the reaction chamber 1200 through the liquid input port 1203, and as the liquid proceeds through the first inner jacket 1253 and the second inner jacket 1255, the liquid can be heated from its initial temperature to an interior operating temperature of interior of the central inner vessel 1220. In this manner, first and second water jackets 1253, 1255 provide for a radial temperature gradient within the reaction chamber 1200, which keeps the walls of the outer vessel 1201 at manageable temperatures significantly lower than an internal operating temperature within the central inner vessel 1220.

Exothermic reactions within the central inner vessel 1220 pressurize the air pocket 1223, and pressurized gas (e.g., steam) can be released from the air pocket 1223 through gas outlet port 1204. The pressurized gas released through gas outlet port 1204 can be routed to other components of a system that includes the reactor chamber 1200, for example, to a charging system that is used to compress air, fuel gas, and/or liquid fuel for injection into the reaction chamber 1200.

Air, fuel gas, and/or liquid fuel can be introduced into the central inner vessel 1220 through port 1228, which emits air, fuel gas and/or liquid fuel into the central inner vessel 1220 through outlets or nozzles 1230. The outlets of the nozzles 1230 can be located around an axis 1250 of the central inner vessel and can be configured to inject the air, fuel gas, and/or liquid fuel into the central inner vessel 1220 with a velocity having a direction within an azimuthal component, so as to impart angular momentum to the liquid 1211 in the central inner vessel, to create a cyclonic rotation in the liquid 1211. The cyclonic rotation in the liquid 1211 can concentrate fuel for combustion reactions close to the axis 1250, while denser materials (e.g., salts and mineral byproducts of the combustion reactions) can migrate radially outward away from the axis 1250 and then drop under the force of gravity to a bottom portion 1224 of the central inner vessel where they can be flushed out of the central inner vessel through port 1234.

The controller 1265 can monitor the temperature, pressure, and volume of liquids, air, gases, and fuel input into the reaction chamber 1200 and coming out of the reaction chamber. For example, an oxygen sensor located in a conduit or chamber connected to gas output port 1204 can monitor an oxygen amount in the gas output from the reaction chamber, and, if the oxygen amount exceeds a threshold value, the supply of air to the central inner vessel 1220 (e.g., through input port 1228) can be reduced. In addition, an amount of carbon monoxide in the gas output from the reaction chamber can be monitored, and, if the carbon monoxide amount exceeds a threshold value, the supply of air to the central inner vessel 1220 can be increased to ensure efficient combustion and energy capture from hydrocarbons and other fuel injected into the reaction chamber 1200.

The techniques described herein have significant advantages. For example, a reaction chamber 1200 is described in which one or more chemically inert (e.g., glass or ceramic) inner vessels one or more water jacket spaces around the inner vessel(s) are used to contain high-temperature, high-pressure reactions (e.g., supercritical water oxidation reactions), while also utilizing radial thermal gradients and the concentration of fuel along a central axis of the inner vessel(s) to protect the metal outer vessel from chemical and/or oxidation attack due to the high temperature, high-pressure reactions. In addition, the cyclonic rotation created within the inner vessel where the high-temperature, high-pressure combustion reactions occur is used to concentrate hydrocarbon fuels along a central axis of the inner vessel, while permitting reaction byproducts to migrate outward to the walls of the inner vessel.

FIG. 13 is a flowchart illustrating a method 1300 for operating a reactor.

In some implementations, the method 1300 can be implemented using apparatus described herein. For instance, the method 1300, can be implemented in a reaction chamber having an outer vessel and a first inner vessel located within a hollow cavity defined by walls of the outer vessel. The first inner vessel can have one or more walls that define an interior of the inner vessel. The interior can contain liquid, with the liquid having a temperature greater than 350° C. and a pressure greater than 3200 psi. The one or more walls can define a longitudinal axis in the interior of the vessel.

At block 1310, the method 1300 includes injecting combustible fuel into the interior of the first inner vessel in a direction, such that the introduced fuel creates a cyclonic rotation of the liquid in the interior of the first inner vessel about the longitudinal axis. At block 132, the method 1300 includes injecting water having a temperature less than 100° C. into a first water jacket space between the first inner vessel and the outer vessel. At block 1330, the method 1300 includes removing water from the interior of the first inner vessel, where water injected into the water jacket space and removed from the interior of the vessel flows through the first water jacket space around the one or more walls of the first inner vessel before entering the first inner vessel though an open end of the first inner vessel.

Example implementations of the method 1300 can include one or more of the following features. For example, the outer vessel can include metal. The first inner vessel can include glass. The reaction chamber can include a second inner vessel within the hollow cavity. The second inner vessel can have one or more side walls between the first inner vessel and a wall of the outer pressure vessel. The water injected into the water jacket space and removed from the interior of the vessel can flow through the first water jacket space around the one or more walls of the first inner vessel and through a second water jacket space between the one or more side walls of the second inner vessel and the first inner vessel before entering the first inner vessel though the open end of the first inner vessel.

Removing water from the interior of the first inner vessel can include removing mineral-rich water from the first interior vessel through a first port having an opening in the interior of the vessel a distance away from the longitudinal axis and removing mineral-poor water from the first interior vessel through a second port having an opening in the interior of the vessel along the longitudinal axis.

FIG. 14 is a flowchart illustrating a method 1400 for producing electrical power, which can be implemented using apparatuses described herein. As shown in FIG. 14, at block 1410, the method 1400 can include combusting fuel mixed in water in a reactor having an internal operating pressure greater than 3200 psi and having an internal operating temperature of greater than 374° C., where the combustion of the fuel is exothermic.

At block 1420, the method 1400 can include pressurizing air for introduction into the reactor to a pressure greater than the internal operating pressure using energy generated from the combustion of the fuel. The method 1400 further includes, at block 1430, injecting the pressurized air into the reactor, at block 1440, pressurizing fuel for introduction into the reactor to a pressure greater than the internal operating pressure using energy generated from the combustion of the fuel, at block 1450, injecting the pressurized fuel into the reactor, at block 1460, injecting pressurized water from the reactor into a drive water column vessel that is partially filled with water to increase a pressure of the drive water column, and at block 1470, injecting water at a temperature less than 100° C. into the reactor to replace water from the reactor that is injected into the drive water column vessel. At block 1480, the method 1400 further includes using pressurized water from the drive water column to drive a hydroelectric drive system to produce electrical power.

Example implementations of the method 1400 can include one or more of the following features. For example, the method 1400 can include controlling an internal pressure of the drive water column, such that the internal pressure of the drive water column when the pressurized water from the reactor is injected into the drive water column causes the injected water to vaporize and for oxide byproducts of combustion of the fuel in the reactor to precipitate in the water in the drive water column. The method 1400 can include expelling steam from the drive water column into a condenser, and condensing the steam to water. Expelling steam from the drive water column can include refilling the drive water column with water received from the hydroelectric drive system to replace water from the drive water column that was used to drive the hydroelectric drive system.

The reactor can include an outer pressure vessel that includes metal and an inner pressure vessel that includes glass, and that is located within the outer pressure vessel. Injecting water into the reactor can include injecting the water into a water jacket space around the inner vessel and between the inner vessel and the outer pressure vessel. The injected water enters an interior of the inner vessel from the water jacket space though an open end of the inner vessel. Injecting the pressurized air into the reactor can include injecting the pressurized fuel into the inner vessel in a direction to cause a cyclonic rotation of the water in the interior of the inner vessel. Injecting the pressurized fuel into the reactor can include injecting the pressurized fuel into the inner vessel in a direction to cause the cyclonic rotation of the water in the interior of the inner vessel.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising, in a reaction chamber having an outer vessel and a first inner vessel located within a hollow cavity defined by walls of the outer vessel, the first inner vessel having one or more walls that define an interior of the first inner vessel, the interior containing liquid, the liquid having a temperature greater than 350° C. and a pressure greater than 3200 psi, and the one or more walls defining a longitudinal axis in the interior of the first inner vessel:
   injecting combustible fuel into the interior of the first inner vessel in a direction, such that the introduced fuel creates a cyclonic rotation of the liquid in the interior of the first inner vessel about the longitudinal axis;
   injecting water having a temperature less than 100° C. into a first water jacket space between the first inner vessel and the outer vessel; and
   removing water from the interior of the first inner vessel, wherein water injected into the first water jacket space and removed from the interior of the first inner vessel flows through the first water jacket space around the one or more walls of the first inner vessel before entering the first inner vessel though an open end of the first inner vessel.

2. The method of claim 1, wherein the outer vessel includes metal, and wherein the first inner vessel includes glass.

3. The method of claim 1, wherein:
   the reaction chamber includes a second inner vessel within the hollow cavity, the second inner vessel having one or more side walls between the first inner vessel and a wall of the outer vessel; and
   the water injected into the first water jacket space and removed from the interior of the first inner vessel flows through the first water jacket space around the one or more walls of the first inner vessel and through a second water jacket space between the one or more side walls of the second inner vessel and the first inner vessel before entering the first inner vessel though the open end of the first inner vessel.

4. The method of claim 1, wherein removing water from the interior of the first inner vessel includes removing mineral-rich water from the first inner vessel through a first port having an opening in the interior of the first inner vessel a distance away from the longitudinal axis and removing mineral-poor water from the first inner vessel through a second port having an opening in the interior of the first inner vessel along the longitudinal axis.

5. The method of claim 1, wherein the outer vessel includes metal, and wherein the first inner vessel includes ceramic.

6. The method of claim 1, wherein the direction in which the combustible fuel is injected into the interior of the first inner vessel is angled upward, with respect to a direction of gravity.

\* \* \* \* \*